United States Patent [19]

Stewart et al.

[11] Patent Number: 4,914,577
[45] Date of Patent: Apr. 3, 1990

[54] DYNAMIC MEMORY MANAGEMENT SYSTEM AND METHOD

[75] Inventors: Darryl J. Stewart, Provo; Randall J. Rorden; Mark Muhlestein, both of Orem, all of Utah

[73] Assignee: ICON International, Inc., Orem, Utah

[21] Appl. No.: 74,310

[22] Filed: Jul. 16, 1987

[51] Int. Cl.⁴ .............................................. G06F 12/10
[52] U.S. Cl. .................................. 364/200; 364/230.6; 364/255.1; 364/255.7
[58] Field of Search ... 364/200 MS File, 900 MS File

[56] References Cited

U.S. PATENT DOCUMENTS

| | | | |
|---|---|---|---|
| 3,618,045 | 11/1971 | Campbell | 364/200 |
| 4,218,743 | 8/1980 | Hoffman | 364/200 |
| 4,254,463 | 3/1981 | Busby | 364/200 |
| 4,325,120 | 4/1982 | Colley | 364/200 |
| 4,347,565 | 8/1982 | Kaneda et al. | 364/200 |
| 4,376,297 | 3/1983 | Anderson | 364/200 |
| 4,378,591 | 3/1983 | Lemay | 364/200 |
| 4,400,769 | 8/1983 | Kaneda et al. | 364/200 |
| 4,442,484 | 4/1984 | Childs, Jr. et al. | 364/200 |
| 4,445,170 | 4/1984 | Hughes et al. | 364/200 |
| 4,473,878 | 9/1984 | Zolnowsky et al. | 364/200 |
| 4,477,871 | 10/1984 | Keshlear | 364/200 |
| 4,484,262 | 11/1984 | Sullivan et al. | 364/200 |
| 4,485,435 | 11/1984 | Sibley | 364/200 |
| 4,488,256 | 12/1984 | Zolnowsky et al. | 364/900 |
| 4,500,962 | 2/1985 | Lemaire et al. | 364/200 |
| 4,519,032 | 5/1985 | Mendell | 364/200 |
| 4,527,232 | 7/1985 | Bechtolsheim | 364/200 |
| 4,528,648 | 7/1985 | Lew | 365/236 |
| 4,545,016 | 10/1985 | Berger | 364/200 |
| 4,550,368 | 10/1985 | Bechtolsheim | 364/200 |
| 4,577,274 | 3/1986 | Ho et al. | 364/200 |
| 4,580,217 | 5/1986 | Celio | 364/200 |

OTHER PUBLICATIONS

Donovan/Madnick, "Operating System", pp. 109–165, 1974, McGraw-Hill.

Primary Examiner—David Y. Eng
Attorney, Agent, or Firm—Workman, Nydegger & Jensen

[57] ABSTRACT

A system and method for allowing dynamic configuration of the translation entries within a memory management system of a computer. In the disclosed embodiment, portions of a logical address from a CPU are defined as offset, page, volume/page, and volume fields. The offset field is presented unaltered to a main memory to select a specific location within a page of memory. The page field forms a first portion of the address of a selected entry in the translation memory. The volume/page field is combined with the contents of a base register as specified by the contents of a mask register to form the remaining portion of the address of a selected entry in the translation memory. The volume field and volume/page fields are compared to one or more tags stored in the translation memory to determine if a match exists. If a match exists, the frame pointer associated with the matching tag is output to main memory as the physical address of the frame containing the desired page.

43 Claims, 24 Drawing Sheets

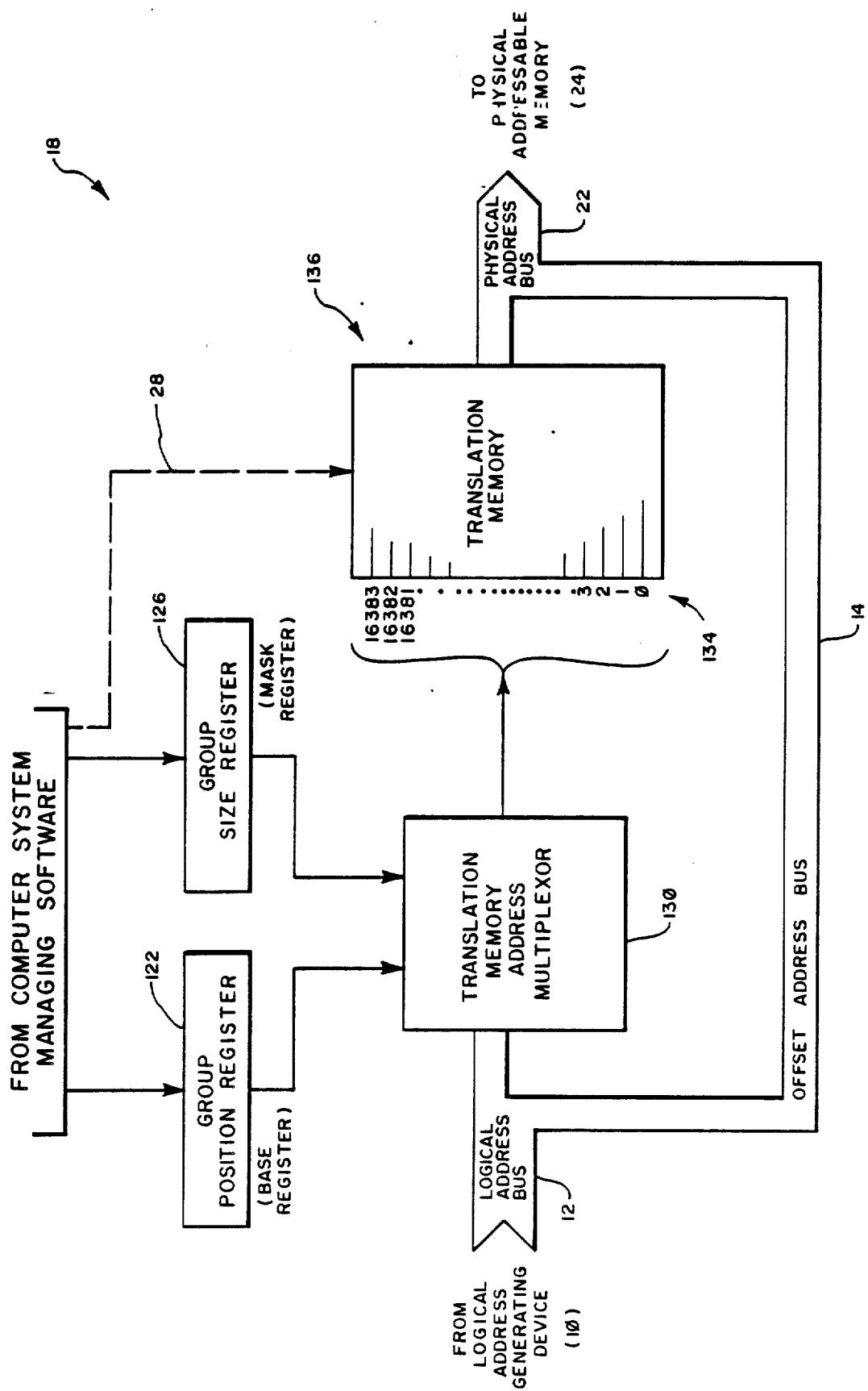
FIG. IA

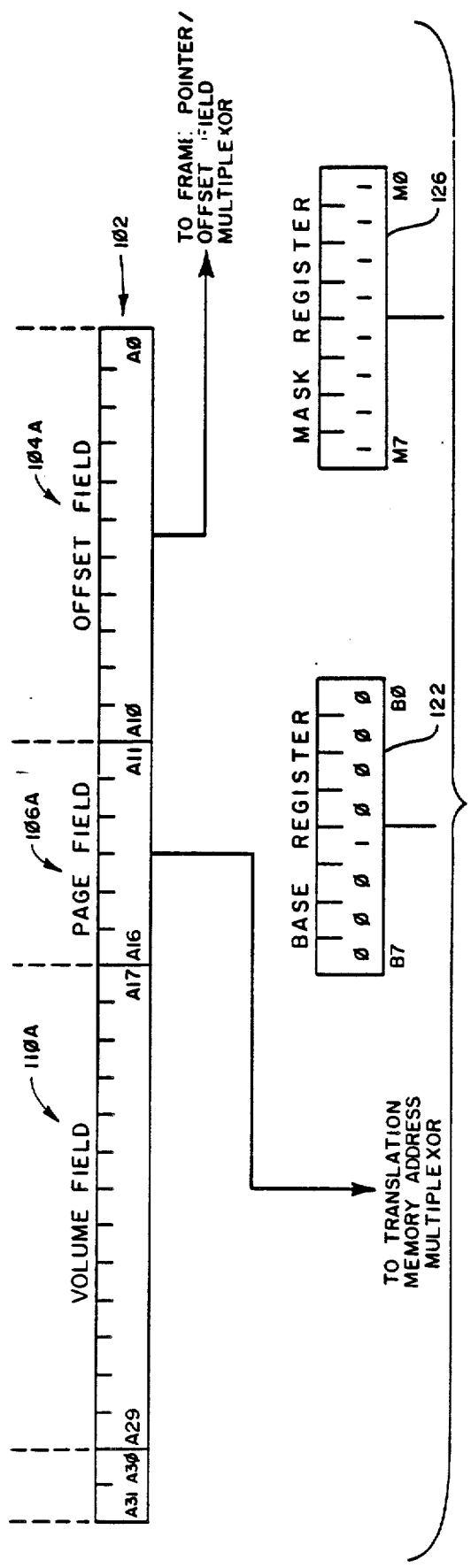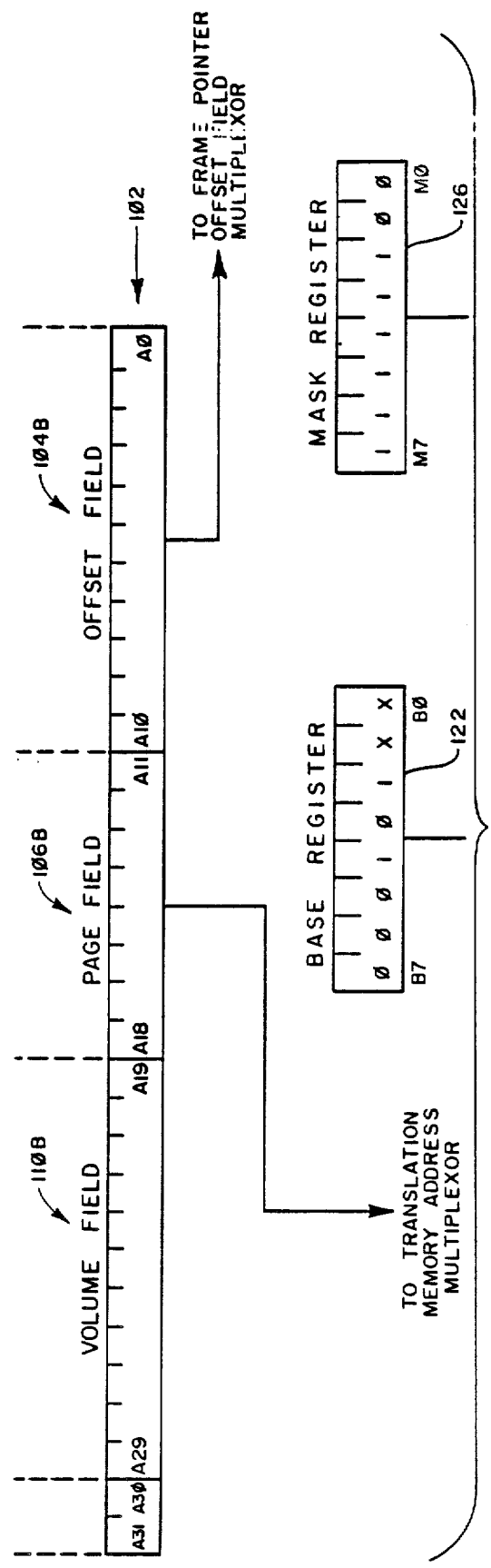

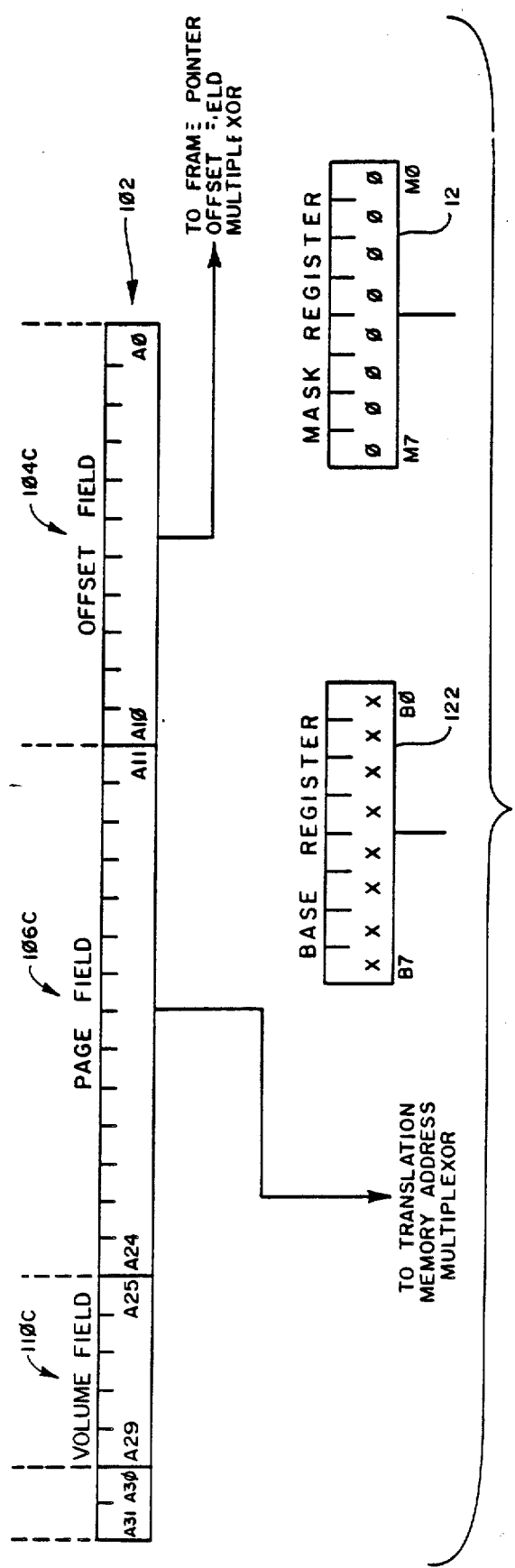

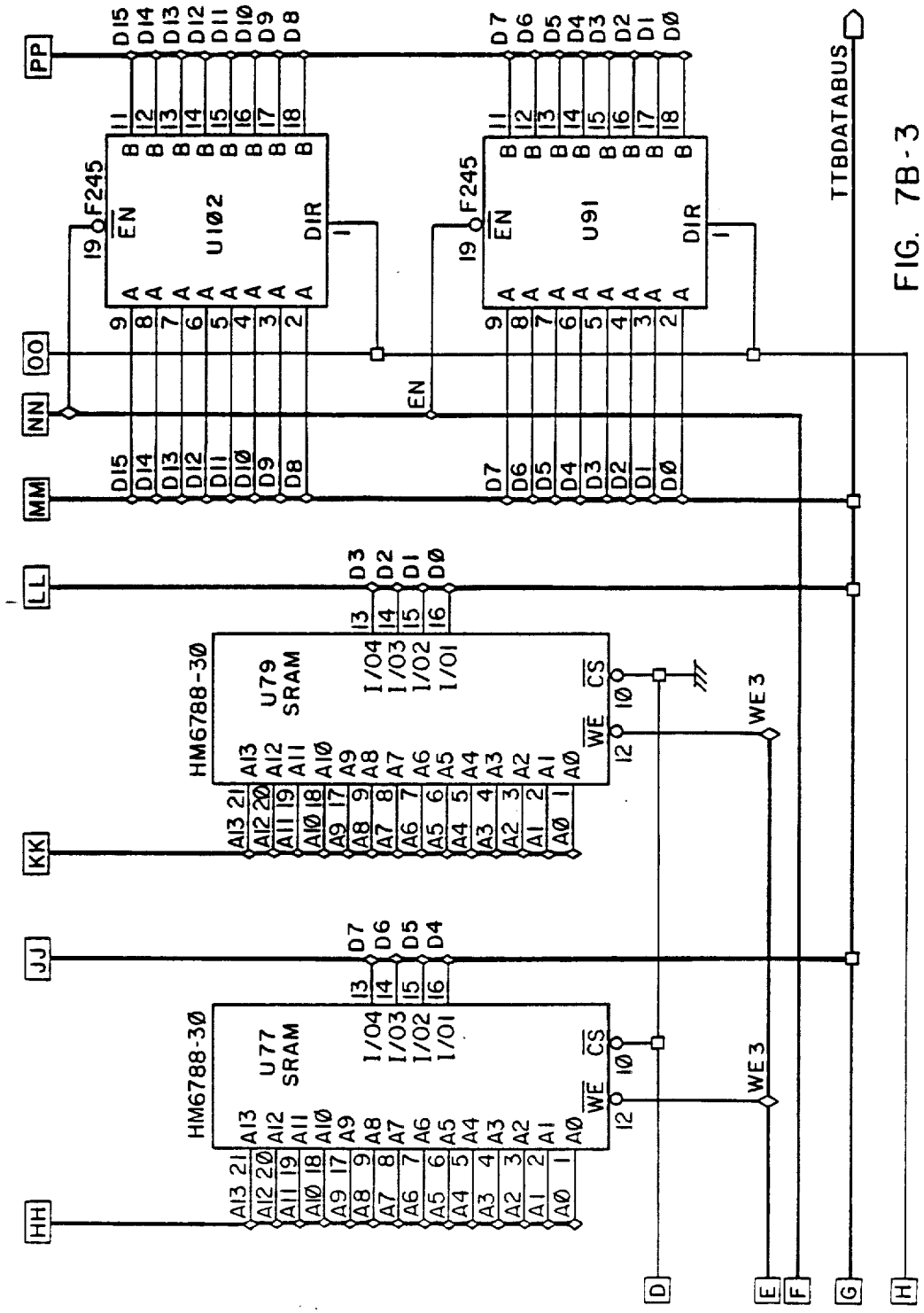

DYNAMIC MEMORY MANAGEMENT SYSTEM AND METHOD

BACKGROUND

1. The Field of the Invention.

This invention relates to systems and methods for managing the memory functions of a digital compputer. More specifically, the present invention is directed to an architecture for a dynamic memory management system for use in a digital computer and corresponding methods.

2. The Background Art.

In recent years, modern digial computers have become significantly more powerful and more complex than the digital computers of just a few years ago. Due to continuing advances in the fabrication of monolithic integrated circuits, and also advances in other technologies, digital computers are expected to become even more powerful and complex in the further. For example, as integrtated circuit for fabrication techniques are developed which allow more circuit elements to be placed onto a single microscopic chip of semiconductor material it becomes possible to dramatically increase the power of digital computers.

While computer hardware has become much more powerful in recent years, those who write computer software, and those who purchase such software, are always desiring more powerful hardware. It can always be expected that a computer programmer's designs, and a user's expectations, will be somewhat limited by the capacity of available hardware. Thus, there is a need to provide computer systems which will meet or exceed the performance requirements of software and the expectations of the users.

Two major parameters which are often used to determine the relative power and performance of a computer are: First, the amount of memory available to the programmer; and, second, the speed at which the computer is able to perform operations (i.e., the number of operations per second). The speed at which many computer systems are able to perform operations is often limited by the speed at which the computer's main memory may be accessed. Furthermore, computer systems that are limited by the size or performance of their memory are often characterized as being "memory bound". Since providing large amounts of memory is relatively expensive, it is important that the available memory be efficiently used.

It is possible to provide immense amounts of digital memory on magnetic or optical memory devices. However, writing data to, and reading data from, these inherently mechanical devices is a laboriously slow task (which is measured in milliseconds) compared to the speed of modern microprocessors which can perform an operation in 150 nanoseconds or less. Still further, the speed of operation of microprocessors is increasing every year. In contract to the performance increases in microprocessors, the gains in operating speed of mechanically operated magnetic and optical disk devices are achieved very slowly, are usually small gains, and come only after a concerted engineering effort.

In most computer systems, a central processing unit (CPU) communicates with a main memory to obtain instructions (often referred to as code) and to read and write data. The CPU accesses a specific main memory location by generating an address and placing that address on an address bus and then sending data to or receiving data from the specified memory location on a data bus. As mentioned previously, efficient use of main memory and speed of memory accesses are major factors affecting the performance of computer systems.

A memory management system, when incorporated into a digital computer, provides capabilities that allow more efficient use of main memory. These capabilities include translation of logical addresses assigned by the CPU (or generated by any other "logical address generating device") to physical addresses in main memory, providing multiple segregated address spaces for different processes residing in the computer, and protecting certain memory areas by allowing only read, write, or execute operations on those areas.

In order to provide the processes (a single computer system may handle many separate processes) residing in a computer system with a large number of logical memory locations within which to operate, while keeping the number of physical memory locations within practical limits, a virtual memory scheme is often used. A virtual memory scheme is commonly one in which the number of memory locations (represented by "logical addresses") which are available to a process is greater than the number of memory locations available in main memory (represented by "physical addresses"). Such virtual memory schemes make efficient use of main memory since any partcular process only requires access to small groups of code or data (hereinafter collectively referred to as "data") for short periods of time.

Thus, an important function of many memory management systems is providing virtual memory support. In this way, the CPU is allowed to access a larger logical memory space than is in fact physically present in main memory. In other words, a progrma or a process may have available to it a virtual memory space much greater than the physical or real memory space available in main memory.

In computer systems implementing a virtual memory scheme, the total amount of memory available to a particular process, for example 1 billion bytes (1 GBytes), is usually stored on a magnetic disk device. A smaller amount of random access memory (RAM), for example 1 million bytes (1 MBytes), is provided for the process in the main memory of the computer system. The data contained on the magnetic disk is moved into the limited space available in RAM as needed by the process. As the process finishes its use of a portion of data, that data is moved from the main memory to secondary storage and replaced by other data moved into the main memory.

The above-described virtual memory scheme is conventionally carried out by dividing the total virtual memory space (also referred to as "logical space") into many equal-sized units called "pages". All of the pages for a process are stored on a secondary storage device, such as a magnetic disk. The locations in physical memory which store the data from one page in logical memory space are referred to as a "frame". As pages of data are required by the CPU they are moved into a frame in the main memory.

Pages may remain in main memory or they may be moved back to secondary storage as determined by their frequency of usage and restrictions on the amount of available main (physical) memory. One usual function of a memory management system is to detect the CPU's attempted accesses to pages not currently present in main memory and causing the suspension of operation of the CPU until the page containing the demanded address has been moved into the main memory.

For example, in a computer system having a memory management system, each page may contain 2048 bytes. The individual memory locations in a page may be sequentially designated 0, 1, 2, 3, . . . 2046, 2047. A process generally accesses data stored in contiquous memory locations. That is, most processes would first access location 0, then location 1, and so on.

When the CPU requires data stored in locations 0, the entire page of data is moved from secondary storage (e.g., a magnetic disk) to the main memory. Such a transfer of data is a very slow process compared to the operating speed of the CPU. During the time that the page of data is being moved to main memory, the execution of the process is suspended and the CPU will generally wait for the requested data.

The task of identifying where data stored in secondary storage is moved to in the main memory is called "mapping". The term "mapping" may be used to describe the process in both memory management systems which do not implement a virtual memory scheme as well as those systems which do.

After a page of data has been moved to the main memory, the location of the page of data is then stored, or mapped, in a specialized memory area referred to as a translation memory. The CPU then, for example, would access the data at location 0 then location 1 until all of the data locations on that page through 2047 had been accessed. Then, if necessary, the CPU would cause the next page of data to be moved into the main memory where the sequence could begin again with an access to location 0 and continue through location 2047. In this way, it can appear to a process that 1 GByte of physical memory locations are available in the main memory while only a part of the data actually resides in the main memory at any one time.

One usual method of determining which pages are contained in main memory, and the location of those pages, at any instant in time is by use of a memory structure termed a translation table or a translation memory which may comprise one or more translation tables. The memory locations found in a translation table itself are referred to as "entries".

A primary function of a memory management system is to recognize a logical address from a logical address generating device, e.g., the CPU, as input and translate that logical address into a corresponding physical address in the main memory which is then output to the main memory. Normally, the translation table is stored in a high-speed random access memory (RAM) internal to the memory management system. The bit pattern of the logical address is used in some fashion to select an entry in the translation memory and the physical address translation stored at that entry is output from the memory management system.

The simplest form of this kind of memory management system is a direct mapped system where there exists an entry in the translation memory for every logical page in secondary storage. This memory management approach becomes impractical when the logical address space is very large, as is often the case in virtual memory schemes. Even when a large page size is chosen, such as 8 KBytes, each process would require 131, 072 entries in the translation table to provide a 1 GByte virtual address space. This is cost-prohibitive and inefficient since high-speed static RAM is expensive and the smallest allocable portion of physical memory main memory) would still be quite large.

A further limitation of direct mapped memory management systems can be seen when multiple processes must share the CPU and main memory. As the computer system inactivates one process to handle another process, various changes must occur within the data distributed throughout the computer system. The act of activating one process and deactivating another is commonly referred to as "context switching". Furthermore, the phrase "context switching time" is used to refer to the time required for the computer system to switch from one process, or context, to another.

Context switching in a direct mapped system requires that the entire contents of the translation table be reloaded as each process becomes active. An alternative to such a system would be to maintain several sets of translations, one for each process. However, this would require even more high speed RAM which will generally be cost prohibitive.

Another approach to memory management uses a fully associative translation look aside buffer. The translation look aside buffer is generally a small content addressable memory (CAM), usually containing only 16 or 32 entries. Each entry is comprised of a tag and a frame pointer. As the CPU generates a logical address, it is compared simultaneously to each of the tags stored in the translation look aside buffer.

If a translation entry which matches is found, the corresponding frame pointer contained in the entry is used as the physical address for the page. If no match is found, the memory management system causes the processor to suspend the memory access until the proper tag and frame pointer can be loaded into the translation look aside buffer, usually from a table in the main memory of the computer system. In some designs, the memory management system fetches the entry automatically and in others, the CPU must execute a software routine to fetch it.

Due to the complexity of content addressable memories, fully associative translation look aside buffer are of limited size, usually on larger than 32 entries. If a process accesses more than 32 pages over a short time period, now entries must be moved in to replace old entries, causing delays. Also, context switching to a new process requires that all translation look aside buffer entries be invalidated.

Yet another approach to memory management system design includes features of both direct mapped and fully associative designs. These are referred to as set associative memory management systems. These systems use a portion of the logical address to select an entry in the translation memory. The remaining portion of the logical address is compared to a tag in the selected translation table entry. If the logical address matches the tag, the frame pointer at that entry is used as the address of the frame in the main memory.

An enhancement to this design provides multiple entries, each with their own tag, which are compared simultaneously. These are referred to as "N-way set associative" memory management systems, where "N" is the number of entries in the simultaneously compared set. A set associative system can be partitioned to allow translations for several processes to reside in main memory at the same time, thus improving context switching speed.

A drawback of previously available N-way set associative memory management systems stems from the fact that the partitions provided in the main memory, and thus also the partitions provided in the translation tables, are fixed in size, regardless of the size of the process. This can leave many translation table entries unused if the process is small. Alternatively, if the process is large, too few translation table entries may be allocated for efficient operation.

Thus, it may be that a particular process requres only 64 frames in main memory (corresponding to 64 2 KByte pages of data) for efficient operation. However, in a conventional N-way set associative memory management system, the translation table may, for example, only be partitioned into areas representing 2048 pages. This is regardless of the fact that many processes might require 64 or fewer frames in main memory while other processes may require more than 2048 frames in main memory for efficient operation.

In view of the foregoing, it would be a significant advance in the art to provide a memory management system which provides entries that can be partitiioned so that only enough translation table entries (each entry representing a page in main memory) could be allocated to each process for efficient operation. It would be a further advance in the art to provide a memory management system which could be dynamically, i.e., "on the fly" or without any significant interruption in computer system operation, partitioned as processes are activated and deactivated.

It would be a further advance in the art to provide a memory management system which would allow the dynamic configuration of translation tables to be implemented by computer system managing software rather than requiring changes in hardware to reconfigure the translation tables. Another advance in the art would be to provide a dynamically configurable memory management unit which is able to translate a logical address to a physical address at a high speed, e.g., without requiring the CPU to "wait" for presentation of requested data from main memory.

BRIEF SUMMARY AND OBJECTS OF THE INVENTION

In view of the drawbacks inherent in memory management systems prviously available, it is a primary object of the present invention to provide a memory management system and method where the translation memory is configurable into variable size groups of entries each group being assigned to one process, the size of the groups being determined by the memory needs of the particiar processes residing in the computer system.

Another object of the present invention is to maximize efficient use of available memory space in the main memory by allocating a large number of translation memory entries, to processes requiring large amounts of memory space for efficient operation while also allocating smaller numbers of translation memory entries to processes requiring smaller amounts of memory space for efficient operation.

Still another object of the present invention is to minimize the number of times a page of data must be moved between main memory and secondary storage.

Yet another object of the present invention is to dynamically, i.e., without substantial interruption in the execution of the computer system allocate to different processes varying size groups of translation memory entries to processes as processes become active and inactive.

Another object of the present invention is to provide a memory management system and method which is able to translation logical addresses into physical addresses at a speed which will not require a CUP associated with the memory management system to wait for the presentation of data.

Still another object of the present invention is to reduce the number of page faults, or "misses", which occur for a given number of valid memory accesses, or "hits".

Yet another object of the present invention is to increase the number of processes which may reside in a computer system.

Another object of the present invention is to provide a high-speed memory management system and method which may be configured dynamically, that is, the pationing of the translation table entries may occur as needed while processes are becoming active and inactive and while the main memory requirements of the various processes change Another object of the present invention is to provide a memory management system and method which allows for a virtual memory scheme to be efficiently implememted.

Still another object of the present invention is to provide a memory management system and method which allows the number of translation table entries allocated to each particular process residing in the computer system to be optimized.

Still another object of the present invention is to provide a memory management system and method which allows memory accesses to occur within the minimum time period allowed by the CPU.

Yet another objcet of the present invention is to maintain the context switching time of a computer system at a minimum.

These and other objects of the present invention will become more fully apparent from following summary, detailed description and claims, taken in conjunction with the accompanying drawings.

The present invention provides a system and method for allowing dynamic configuration of the translation memory entries within a memory management system of a computer. In the disclosed embodiment, portions of a logical address generated by a CPU are defined as offset, page, volume/page, and volume fields. The offset field is presented unaltered to a main memory to select a specific location within a page of memory. The page field forms a first portion of the address of a selected entry in the translation memory. The volume/page field is combined with the contents of a base register as specified by the contents of a mask register to form the remaining portion of the address of a selected entry in the translation memory. The volume field and volume/page fields are compared to one or more tags stored in the translation memory to determine if a match exists. If a match exist, the frame pointer associated with the matching tag is output to main memory as the physical address of the frame containing the desired page.

The present invention allows the number of translation table entries, and thus the amount of corresponding space in the main memory, which is allocated to each process to be varied on a process-by-process basis. The present invention has application in computer systems where it is desired to implement a virtual memory scheme or to simply relocate logical addresses assigned by a logical address generating device to physical addresses in main memory. The present invention also allows each process to be provided with an optimum number of translation memory entries which are required for efficient operation. Since the allocation of translation entries occurs while processes are becoming active and inactive, i.e., dynamically, the memory management system of the present invention is referred to as a dynamic or dynamically configurable memory management system.

The present invention includes at least one translation memory means for mapping a logical address presented by a logical address generating device, e.g., a CPU, to a physical address in an addressable memory, e.g., a main memory. Hardware structures are also provided which allow the computer system managing software (e.g., "system software" or the "operating system"), to direct the dynamic allocation of the number of translation table entries accessible by each process. In this way, the system software can control the quantity of addressable memory immediately accessible by each of the various processes residing in the computer system.

These hardware structures include devices which are referred to in this description as a mask register or group size register used to receive instructions from the system management software indicating the number of translation table entries which will be allocasted, or "partitioned", for a particular process. Hardware structures are also provided, which are referred to in this description as a base register or group position register, which is used to indicate the position or address within the translation table where a group of translation table entries begin. The system managing software determines the number of translation table entries to be allocated to a particular process and controls the allocation and the positioning of the selected translation table entries.

The method of the present invention may be carried out using many different hardware schemes. In one embodiment of the present invention, a logical address is first presented to the memory management system. An offset field portion of the logical address is then defined. The offset field portion of the logical address specifies the location within a particular page of main memory in which the desired data is located. Next, a page field and a volume field are defined in the logical address.

By varying which bits in the logical address are defined as comprising the page field and which bits are defined as comprising the volume field, the system of the present invention determines the partitioning of the translation table into groups of entries, each group being assigned to one process. The system managing software, such as an operating system, indicates to the memory management system of the present invention how many translation entries to allocate to a process,. Thus, no hardware modification is necessary to reconfigure the translation table partitioning. Still further, the system managing software is able to vary the translation table partitioning dynamically, i.e., without suspension of normal operation.

In the method of the present invention, a base value is also provided by the system managing software. The base value specifies an index position in the translation table. A translation table entry is then selected according to the information contained in the page field which indicastes the distance from the base position that the desired translation table entry is located.

A tag, contained in the selected translation table entry, is compared to the volume field defined in the logical address. It is then determined whether the volume field of the logical address and the tag field of the selected translation table entry are equvalent. If a match occurs (i.e., the volume field and the tag are equivalent), the frame pointer (a portion of the selected translation table entry which identifies a frame in the main memory) is concatenated with the offset field portion of the logical address to form a physical address representing a single location in main memory. The physical address is then presented to the main memory or other addressable memory device.

BRIEF DESCRIPTION OF THE DRAWINGS

In the description which follows, and in the accompanying drawings, many of the figures have been divided into two or more parts in order to increase their clarity. Where a figure has been divided into two or more parts, the designation "-N" has been added as a suffix to the figure number where "N" is the part into which the figure has been divided. For example, in the detailed schematic diagram shown in FIG. 7A, the figure has been divided into four parts designated as "FIG. 7A-1", "FIG. 7A-2", "FIG. 7A-3", and "FIG. 7A-4". In the case of detailed schematic diagrams which have been divided into four parts, the schematic may be reassembled by placing the first part in the upper left position, the second part in the upper right position, the third part in the lower right position, and the fourth part in the lower left position. Also, the boxed letter designations indicate interconnections between the different parts of the same figure.

FIG. 1A is a block diagram that schematically represents the major functional blocks of one embodiment of the present invention used to provide an overview of the invention concepts utilized by the present invention.

FIGS. 3A–3C are diagram that schematically illustrate arrangements of the logical address bits used in the presently preferred embodiment of the present invention.

FIGS. 7A1–7A4 and 7B1–7B4 are detailed schematic diagrams showing a circuit implementation of the translation memory of the presently preferred embodiment of the invention.

FIGS. 8-1 to 8-3 detailed schematic diagrams showing a circuit implementation of the tag comparator circuits of the presently preferred embodimnet of the invention.

FIGS. 9-1 to 9-4 are detailed schematic diagrams showing a circuit implementation of the frame pointer/offset field multiplexor circuit of the presently preferred embodiment of the invention.

DETAILED DESCRIPTION OF THE PRESENTLY PREFERRED EMBODIMENT OF THE INVENTION

Reference is next made to the drawings, in which like parts are designated with like numerals. It should be understood that the embodiment described herein, both of the system and of the method, is simply illustrative of the presently preferred embodiment of the invention, and that the invention may be carried out by other equivalent structures and methods.

A general schematic description of the system and method of the presently preferred embodiment is first presented, followed by a description of the circuit implementation of the system of the described embodiment. In order to increase the clarity of the detailed schematic diagrams of the circuitry of the presently preferred embodiment which are included herewith (FIGS. 6-9), the alphanumeric designations commonly used in the art have been retained in these drawings.

1. General Overview of the Invention Concepts Utilized by the Present Invention—FIGS. 1, 1A and 1B.

Figure 1:
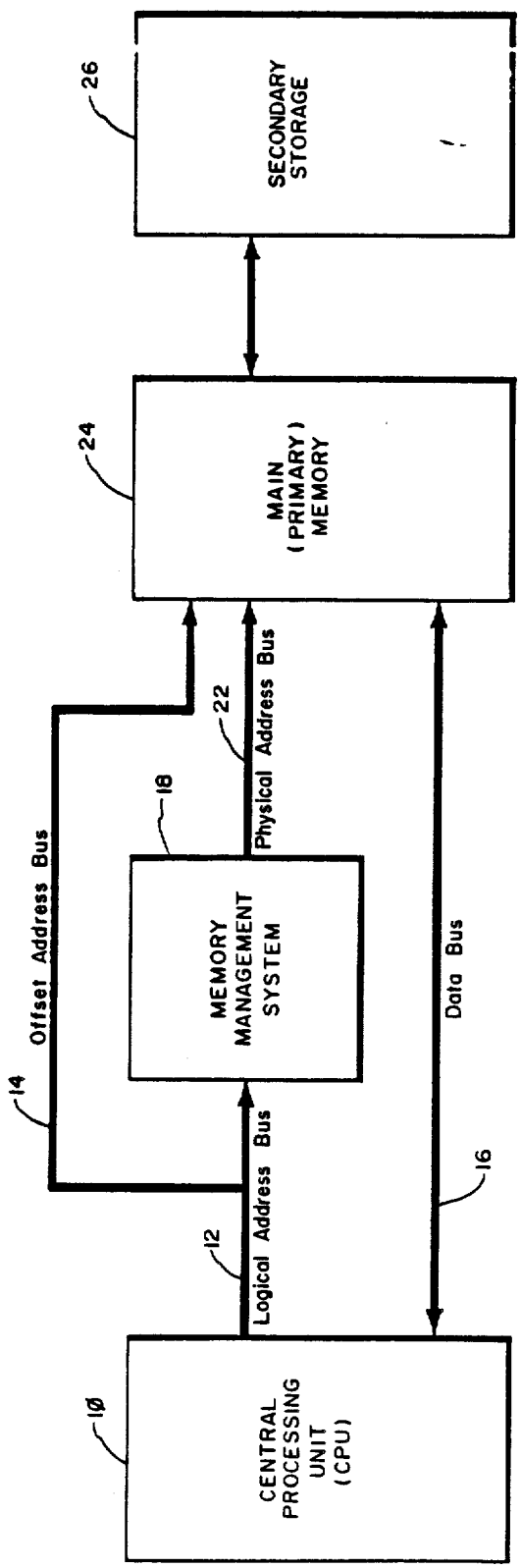
FIG. 1 is a block diagram that schematically represents the major functional elements of a computer system including the memory management system of the present invention.

Reference will now be made to FIG. 1. FIG. 1 is a block diagram indicating the architercture of a computer system which includes the presently preferred embodiment of the memory management system. At the heart of the computer system is a microprocessor or central processing unit (CPU), represented at 10.

It will be appreciated that the term CPU can refer to either a microprocessor or to other hardware structures. In the presently preferred embodiment described herein CPU 10 is a Motorola MC68020 microprocessor. Those skilled in the art will appreciate that the MC68020 is a powerful 32 bit microprocessor which, in the presently preferred versions, may be operated at either 16.67 MHz or 20 MHz. The MC68020 microprocessor has many features which make it particularly well adapted for use as a CPU with the presently preferred embodiment. For example, the MC68020 is well suited for operation in a multi-processing environment, i.e., a computer system hosting a number of different processes which become active as needed. Other useful features of the MC68020 CPU will become apparent later in this disclosure.

Importantly, those skilled in the art will appreciate that many alternative microprocessors and equivalent circuits, whether used alone or in combination with other similar devices, can be used with the present invention. Furthermore, after gaining an understanding of the present invention, those skilled in the art will appreciate how to provide embodiment incorporating the present invention using such alternativ microprocessors, or equivalent devices and structures, which are now available or which may become available in the further.

CPU 10 requires that data be retrieved form main (primary) memory 24. It is possible for a CPU to be provided with an address bus directly connecting the CPU to main memory. However, as explained earlier, it is often much more efficient to provide a memory management system, represented by block 18 in FIG. 1, which interfaces CPU 10 with main memory 24.

It should also be noted that other "logical address generating devices" may also be connected to logical address bus 12 and thus may also have access to main memory 24 through the memory management system 18. When such other logical address generating devices are connected to logical address but 12, memory management system handles memory address by these other devices just as if made by CPU 10. Thus, any reference to a CPU in this description also has equal applicability concerning other logical address generating devices.

When CPU 10 requires that data be retrieved from main memory 24, CPU 10 presents and address on logical address bus 12 in FIG. 1. It will be appreciated by those skilled in the art that throughout this disclosure the term "bus" will refer to a group of one or more conductors which carry one or more signals. In the presently preferred embodiment, sine CPU 10 is a 32 bit microprocessor, nearly all address and data buses will be groups of 32 conductors arranged such that 32 bits of address or data may be transmitted in parallel.

However, it should be appreciated that both data and address buses may be implemented in many different forms which may have application in the present invention. Furthermore, as is customary in the art, in the drawings a bus is represented by a heavier line in order to distinguish it from single conductor lines, rather than showing the individual conductors of the bus.

Still further, as used herein, the term "data" will be given a broad meaning. That is, the term "data" will be used to refer to any bit arrangements contained within a computer system whether it be an executable instruction (code) or numerical values which are to be manipulated by the CPU.

When CPU 10 presents a logical address it is received by memory management system 18. However, as will be explained later, in the presently preferred embodiment (FIGS. 2-5) a portion of the logical address does not undergo any manipulation by memory management system 18 and is directly presented by way of the offset address bus 14 to main memory 24.

Once received by memory management system 18, the logical address is translated into a physical address and the physical address is presented by physical address bus 22 to main meory 24. However, if memory management system 18 determines that the desired data is not contained within main memory 24, the memory management system issues a "page fault" which will cause CPU 10 to suspend the operation.

Furthermore, memory management system 18 will cause the requested data to be found in the secondary storage device, represented by block 26 in FIG. 1, and the page containing that data will be moved into an appropriate location in main memory 24. Secondary storage 26 in the presently preferred embodiment generally comprises a magnetic disk memory device. As will be appreciated, very large amounts of memory may be provided by magnetic disk memory at a very low cost per bit. It should be appreciated that even thought the presently preferred embodiment implements a virtual memory scheme, the present invention has application in either computer systems with virtual memory capability or computer systems not implementing a virtual memory scheme.

Once the appropriate data has been placed in main memory 24, the contents of the memory management system internal translation tables (not explicitly represented in FIG. 1) are then reorganized. CPU 10 then reinitiates the last address request. Since the appropriate data has now been moved into main memory 24, and the translation tables have been updated, the address request may then be carried out and the accessed data will be presented on data bus 16 to CPU 10.

A primary goal of an efficient memory management system is to minimize the number of page faults which occur. As explained previously, earlier attempts in the art to accomplish this generally require larger amount of very fast assess memory be provieded within the memeory management system. However, it is generally cost prohibitive to provide the required amounts of fast access memory. Furthermore, in previously available systems, as the number of processes which reside within the computer system increases, the number of page faults which occur generally increases as the size of the translation memory remains constant. The present invention overcomes these limitations.

In order to best explain the important inventive concepts underlying the present invention, the block diagram of FIG 1A is provided. The block diagram of FIG. 1A represents an embodiment of the present invention utilitizing a translation memory 136 which contains one translation table having 16,384 entries (0-383)

Memory management system 18 in FIG. 1A may serve several important functions. For example, the various processes running on the computer system each require some space in main memory 24 for operation. Furthermore, the computer system managing software, such as an operating system, requires a minimum amount of memory be constantly available to it.

Small computer systems that are capable of running only one process or program at a time do not require a memory management system such as that illustrated in FIG. 1A. This is due to the fact that upon system power up, or on reboot, a specific portion of memory is dedicated to the operating system. The remaining space in main memory is dedicated to the single process (for example, a word processing program or spread sheet program) which is to be run by the user. In contrast, a computer system which simultaneously handles several processes, whether for a single user or for multiple users, must allocate memory space for each of the processes to be handled.

One approach to providing memory capacity for several processes is to dedicate a section of memory to each individual process to be handled by the computer system. This approach is generally very inefficient since an unalterable amount of space in the main memory must then be continuously dedicated to each process even though many of the processes may not use the dedicated space in main memory for long periods of time.

Thus, the efficient use of a main memory in a computer system handling multiple processes requires that a memory management system be included in the computer system. The embodiment of the present invention illustrated in FIG. 1A may be incorporated into the computer system illustrated in FIG. 1 in order to allow the computer system to make efficient use of main memory space while simultaneously handling multiple processes.

During the operation of the embodiment illustrated in FIG. 1A, a logical address is placed on logical address bus 12. The logical address may be generated by any logical address generating device, including a CPU 10.

In the memory management systems previously available, each process is assigned a group of translation memory entries (the addresses of which are represented by the numerals generally designated 134 in FIG. 1A).

For example, in the embodiment illustrated in FIG. 1A, each translation memory entry represents a 2 KByte page in main memory 24. The locations in main memory which store a page of data are generally referred to as a "frame". Thus, in prior memory management systems incorporating a translation memory having $16,384_{10}$ (the subscript indicating the base of the number) entries and initially requiring memory space for four processes, the memory management system might assign the entries 0–4095 to process no. 1, entries 4096-8191 to process no. 2, entries 8192-12,287 to process no. 3, and entries 12,288-16,383 to process no. 4.

In the current example, each process would be provided 8,388,608 bytes (commonly referred to as 8M Bytes) of main memory space assuming that each translation memory entry 134 represents a 2 KByte page of memory). However, using this approach is generally very inefficient.

First, many processes require much less than 8 Mbytes of main memory. For example, many processes require 256 KBytes, 128 KBytes, 64 KBytes, or less space in main memory at any instant in time in order to run efficiently. Conversely, some processes (often referred to as "number crunchers") may require much more than 8 MBytes of main memory for efficient operation. Thus, the previously available memory management systems inefficiently use main memory space because too much main memory space is allocated (i.e., too many translation memory entries) to some processes while not enough main memory space is allocated to other processes.

Furthermore, because larger processes require more memory space than is allocated, page faults continuously occur as pages in memory must be moved between main memory and secondary storage. Additionally, since the smallest group of entries which may be allocated to an individual process is 4096 when an additional process, for example process no. 5, requires space in the main memory, the memory space allocated to one of processes nos. 1–4 must be given to process no. 5. This is true even though processes nos. 1–3 each require only 256 KBytes of the 8 KBytes of memory allocated to each process. Thus, in previously available memory management system page faults sometime occur almost continuously and noticeable and frustrating operational delays are experienced by computer system users as pages of data are moved between main memory and secondary storage.

The present invention overcomes the limitations and difficulties inherent in the previously available memory management systems. The present invention provides that each process may be allocated a different size group of translation memory entries. Thus, carrying on the obove-mentioned example, with the present invention processes nos. 1–3 may each be allocated 128 translation memory entries (grouped from 0-127, 128–255, and 256-383) which will provide each of processes nos. 1–3 each with 256 KBytes of space in main memory 24 ( 128 pages).

Importantly, with processes nos. 1-3 being allocated only 384 translation memory entries, process no. 4 may be allocated up to 8,192 entries which maps up to 16 MBytes in the main memory. Alternately, rather than increasing the memory sapace available for process no. 4, a large number of smaller processes could be allocated space in the main memory 24. The embodiment illustrated in FIG. 1A high-lights the particular inventive concepts which are used to carry out the present invention.

As mentioned, a logical address is placed on logical address but 12 from a logical address generating device 10. Translation memory address multiplexor 130 then functions to select one of the 16,384 translation memory entries 134 according to the bit pattern present on logical address bus 12, and in group position register 122 and group size register 126.

Group size register 126, also referred to as a mask register, determines how many translation memory entries are allocated to the process currently active in the computer system. Group position register 122, also referred to as a base register, determines where (i.e., a base position) a particular group of translation memory entries will be located within translation memory 136.

In operation, when computer system managing software activates, for example, process no. 1, the appropriate bit pattern will be loaded into group size register 126. Also, the appropriate bit pattern is loaded into group position register 122. Translation memory address multiplexor 130 is thus provided with the information needed to determine the translation memory entry group size and the position of the group. Translation memory address multiplexor 130 then uses the bit pattern present on logical address but 12 to select one translation memory entry out of the group previously defined by the bit patterns loaded into group size register 126 and group position register 122.

Once the appropriate translation memory entry has been selected, the bit pattern found within the selected translation memory entry is placed on physical address bus 22. The bit pattern from the selected translation memory entry forms the most significant bits of the physical address which designates the address of one frame within main memory 24. The bit pattern present on offset address bus 14, which represents the location within a page of data or a frame, is placed on the physical address bus to form the least significant portion of the physical address. The concatenated translation memory entry bit pattern and the offset address bus bit pattern are presented to physical addressable memory 24 which then accesses the addressed location in main memory 24.

Those skilled in the art will readily appreciate that several tasks must be carried out by the computer system managing software, or operating system, and that many existing operating systems may be modified to carry out these tasks. For example, it will be appreciated that the computer system managing software must properly load group position register 122 and group size register 126. Another task assigned to the computer system managing software is that of loading the proper values into translation memory 136 as represented by the dashed line 28 in FIG. 1A. Those skilled in the art will appreciate that having the group size under software control provides maximum flexibility since no hardware changes are necessary to reconfigure the partitioning of translation memory 136.

Figure 1B:
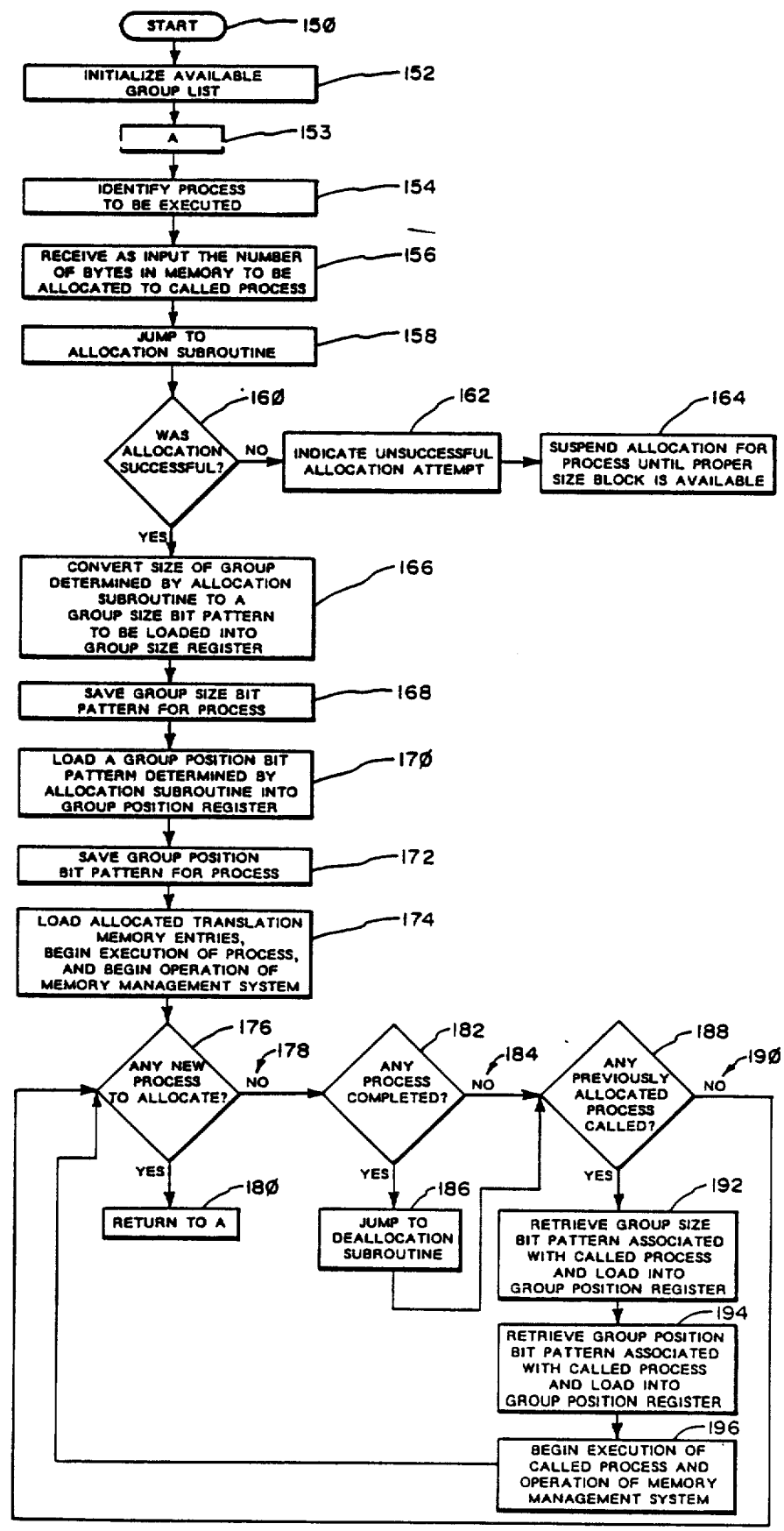
FIG. 1B is a flow chart indicating the steps to be carried out by the system managing software of the computer system incorporating the present invention.

In order to clearly indicate which steps must be carried out by the computer system managing software, e.g., the operating system, the flow chart of FIG. 1B is provided. It will be appreciated that the steps illustrated in FIG. 1B may readily be incorporated into many existing operating systems.

In the flow chart of FIG. 1B the symbol marked 150 and labeled "start" represents the time that the computer system incorporating the present invention is powered up or is rebooted. The first step which must be carried out is to initialize the available group list as represented by the symbol marked 152. Since no translation memory entries have yet been allocated to a process, the list of available groups includes all translation memory entries.

As the computer system begins operation, a process will be called by a user. Thus, the next step is to identify the process to be executed as represented by the block marked 154. Then, as represented at 156, it is necessary that the number of bytes necessary in memory for the process be input. This information is received from a user, or from data contained in the code for the process, or a default value assigned by system managing software. Once the number of bytes required in the main memory is known, the number of translation table entries to be allocated to the process is easily calculated.

Once the number of translation table entries to be allocated is calculated, a subroutine to determine allocation of translation table groups is carried out as represented at 158 in FIG. 1B. A typical example of such an allocation subroutine is included in the Appendix which is attached hereto and incorporated herein by reference. The source code of the Appendix is written in the "C" programming language and is based upon alogrithms found in the publication: Knuth, Donald E., *The Art of Computer Programming, Volume* 1 *Fundamental Algorithms* (1973) which is incorporated herein by reference.

If the allocation was unsuccessful, such as when there is not an available group of entries large enough to accommodate the process, such is indicated at the symbol marked 162, the process remains inactive until a group of suitable size becomes available as represented at 164. A group will become available as processes are completed or are suspended and the "free" groups of entries are added back to the available group list.

If the allocation is successful then, as represented at 166, the size of the group is converted into the bit pattern which is loaded into the group size register. The group size bit pattern for the process is also saved in memory for later use as indicated by the symbol marked 168.

The allocation subroutine also determines the location of the group within the translation memory. Thus, the beginning address of the group is loaded into the group position register as a bit pattern (170) and the group position bit pattern for the process is also saved in memory for later use as represented at 172.

Once the allocated translation memory entries and the appropriate bit patterns have been loaded into the group size register and the group position register, the execution of the process and operation of the memory management system may begin as indicated at 174 in FIG. 1B. If there are any "new" processes (i.e., previously unallocated processes) then the steps occurring between the symbol labeled "A" and marked 153 and the symbol marked 176 are carried out again. If there are no new processes, then the "no" alternative generally indicated at 178 is chosen.

With no new process requiring allocation of translation memory entries, then it is necessary to deallocate any unused entries. As represented by the symbol 182 in FIG. 1B, any processes which have been completed are deallocated by causing the execution of a deallocation subroutine, represented at 186. An example of source code implementing a deallocation subroutine described in the above-mentioned Knuth reference is also included in the Appendix attached hereto.

After execution returns from the deallocation subroutine, or if no processes were completed as represented by the "no" alternative marked 184, it is necessary to determine if any processes which have previously been allocated translation memory entries have been called as represented by the symbol marked 188. If not, as indicated by the "no" alternative marked 190, then execution loops back to the step represented by the symbol marked 176. If a "previously allocated" process is called, the group size bit pattern is retrieved and loaded into the group size register (the step represented at 192) and the group position bit pattern is also retrieved and loaded into the group position register (the step represented at 194).

Once the group size register and the group position register are properly loaded, execution of the called process may begin and the memory management system begins operation (as represented at 196 in FIG. 1B). Execution may then return to the step represented at 176 and the loop continues until the system is powered down or rebooted.

2. General Schematic Representation of the System and Method of the Presently Preferred Embodiment of the Present Invention—FIGS. 2-5.

Figure 2:
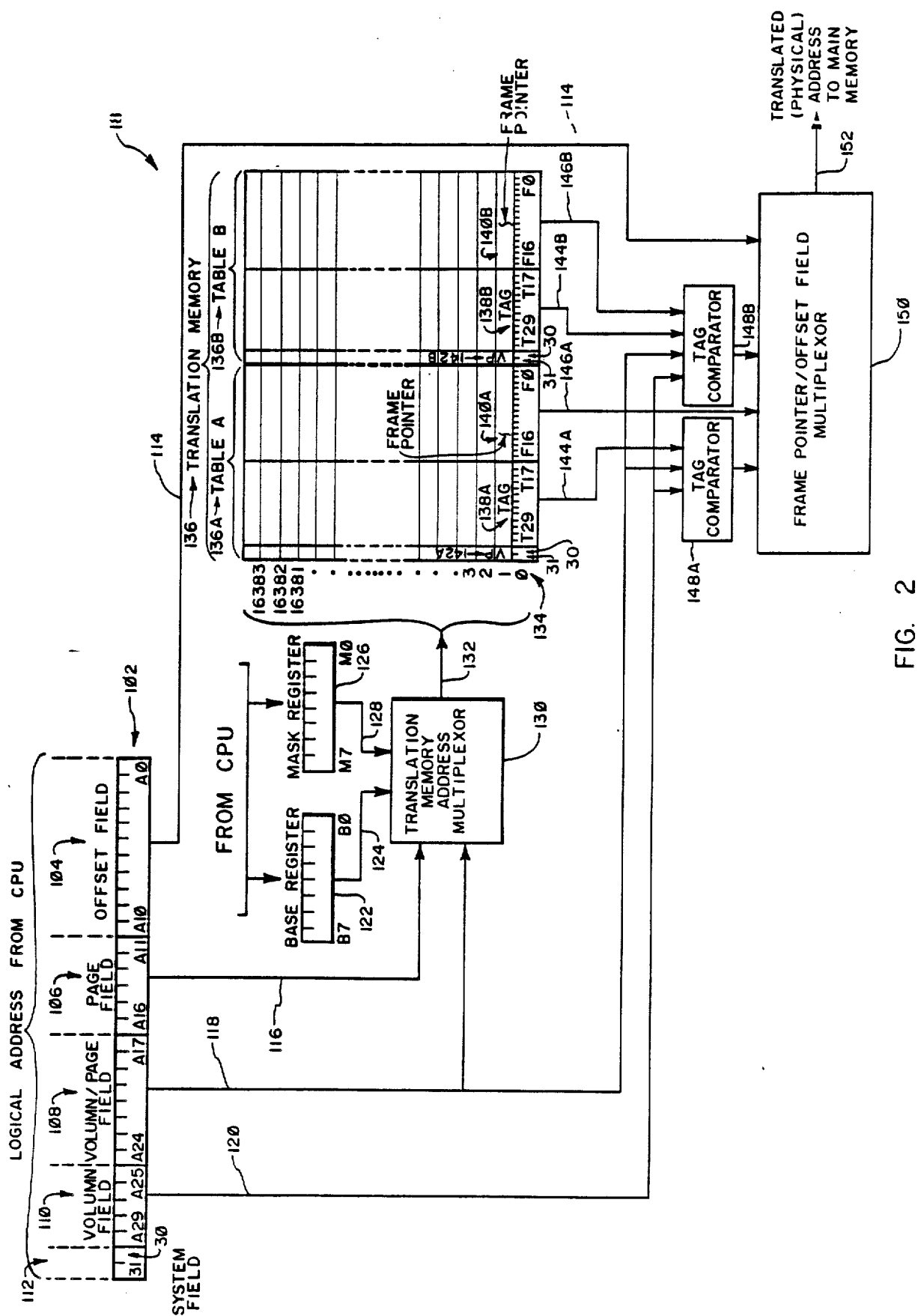
FIG. 2 is a block diagram that schematically represents the major functional elements of a presently preferred embodiment of the memory management system of the present invention.

Reference will now be made to FIG. 2 which is a block diagram schematically representing the presently preferred arrangement for the memory management system of the present invention. The embodiment illustrated in FIG. 2 is intended to be incorporated into a computer system utilizing the Motorola MC68020 microprocessor. Complete information concerning the MC68020 microprocessor can be found in the publication entitled MC68020 32-Bit *Microprocessor User's Manual*, 2d. Ed. (1985), available from Prentice-Hall Publishers, which is incorporated herein by reference.

Furthermore, it will be appreciated that the present memory management system can only be fully utilized when main memory 24 in FIG. 1, or another addressable device, is able to operate at very high speeds. A high speed main memory particularly well suited for use with the present invention is described in the copending U.S. patent application Ser. No. 075,063 filed concurrently herewith, entitled "STATIC FRAME DIGITAL MEMORY", which is incorporated herein by reference.

As explained earlier, requests for data by the CPU are identified by a logical address. In FIG. 2, the logical address of the presently preferred embodiment is represented by a block generally designated 102. As can be seen in FIG. 2, the logical address comprises a 32-bit word. It will be appreciated, however, that the present invention has application in computer systems using a word consisting of any number of bits.

In FIG. 2 logical address block 102 is graduated into 32 increments, each increment representing one bit. Thus, the increment labeled A0 represents the least significant bit in logical address 102 while the increment labeled A31 represents the most significant bit in logical address 102.

In accordance with the present invention, the logical address is divided into various fields, each field serving a particular function and providing specific information. In the presently preferred embodiment, the logical address is divided into an offset field (generally designated 104), a page field (generally designated 106), a volume/page field (generally designated 108), a volume field (generally designated 110), and a system field (generally designated 112). The function of, and the information provided by, each of these fields will be explained below.

An important element of the presently preferred embodiment of the present invention is an arrangement of memory referred to as a translation memory as shown in FIG. 2 and generally designated 136. The translation memory comprises two translation tables 136A and 136B. The phrase "translation table" has been adopted since in practice the translation memory may be most easily conceptualized as a table of data as might be found on a printed page. However, the actual locations of data bits within the circuit implementation of the translation memory may not mimic the "table arrangement." Still, the concept of a translation "table" is most helpful to explain the principles of the present invention.

Furthermore, it should be appreciated that it may be possible to use many different translation memory structures, such as using a content addressable memory (CAM), in accordance with the present invention. It is expected that devices such as CAMS and other devices and structures which are suitable for use as translation memory may be used in the present invention.

In the presently preferred embodiment illustrated in FIG. 2, the translation memory comprises two translation tables, table A generally designated 136A, and table B, generally designated 136B. From the previous discussion, it will be appreciated that the presently preferred embodiment incorporates what is known in the art as a "two-way set associative translation memory."

It will also be appreciated that the circuit implementation of translation memory 136 may take many different forms, one of which will be explained in detail later in this disclosure. Furthermore, it will be appreciated that the translation memory may incorporate only a single translation table or many translation tables. However, for purposes of the presently preferred embodiment, it has been found that a two-way translation memory, i.e., two translation tables within the translation memory, provides excellent performance when balanced against the cost of providing additional memory.

Since it is an object of the present invention to allow memory accesses to occur within the minimum time period allowed by the CPU, it is desirable that the translation memory be of the type which may be accessed very rapidly. For example, when using the MC68020 microprocessor, this time is preferrably less than 30 nanoseconds.

In the presently preferred embodiment the translation memory is comprised of the type of devices generally referred to in the art as static random access memories (SRAM) which will be described in detail later in this disclosure. However, other types of memory devices which are presently available, or which may become available in the future, may also be adaptable for use with the present invention.

As represented in FIG. 2, each translation table, 136A and 136B, in the presently preferred embodiment is provided with 16,384 entries, each entry comprising a 32-bit word. The entries in both translation tables, 136A and 136B, are simultaneously accessed when one translation memory address is presented. A few translation memory addresses, corresponding to sets or pairs, of entries, are represented by the vertical increments labeled 0, 1, 2, 3 ... 16,381, 16,382, and 16,383 and generally designated 134.

It should be noted that throughout this disclosure and in the appended claims the term "entry" is used to indicate what in the presently preferred embodiment is a pair of entries. However, in order to increase the clarity of this disclosure and the appended claims, and since in an N-way set associative translation memory addressing one entry also addresses all other entries in the set, the term "entry" will be used herein with the understanding that it is intended to include within its meaning "sets of entries" in N-way translation memories or "pairs of entries" in two-way translation memories as well as equivalent structures.

It is helpful to note at this point that a 14-bit translation table address is sufficient to uniquely identify any pair of the 16,384 entries in translation tables 136A and 136B. It should be appreciated that the number of entries in the translation tables, 136A and 136B as is the case with the number of translation tables within the translation memory, may be greater than or less than the number illustrated in FIG. 2. Considerations such as cost limitations, system performance requirements, and physical space availability within the computer system will determine the number of entries provided within each translation table.

As shown in FIG. 2, each translation table entry is graduated into 32 increments, each increment representing a bit. Bits 0 through 16 are used as the frame pointer of each entry, generally designated 140A and 140B in FIG. 2. Thus, the least significant bit and the most significant bit of the frame pointer of the translation table entries are designated F0 and F16, respectively, in FIG. 2.

The bits of each translation table entry, generally designated 138A and 138B in FIG. 2, are referred to as a tag. Thus, in FIG. 2 the least significant bit and most significant bit of the 13 bits comprising the tag portion of each entry are designated T17 and T29, respectively. The remaining two bits, bits 30 and 31, of each translation table entry are defined as validate and protect (VP) bits 142A-142B.

As will be appreciated by those skilled in the art, the term "tag" is ordinarily used to designate a sequence of bits which will later be compared to another group of bits to determine their equivalency. Such is the case with the bits contained in the tag of each translation table entry. The function performed by the frame pointer, tag, and the validate and protect bits of each translation table entry will be explained further below.

As shown in FIG. 2, also provided in the presently preferred embodiment is an 8-bit mask register 126 (with bits M0-M7) which corresponds to group size register 126 in FIG. 1B and an 8-bit base register 122 (with bits B0-B7) which corresponds to group position register 122 in FIG. 1B. Mask register 126 and base register 122 are associated with a translation memory address multiplexor identified as block 130.

Also shown in FIG. 2 are two tag comparators represented by blocks 148A and 148B. Each tag comparator 148A and 148B is associated with its corresponding translation table, 136A or 136B, respectively. Also included in the presently preferred embodiment is a frame pointer/offset field multiplexor represented by the block 150.

The general structure and function of all of the previously identified functional blocks will now be explained. The detailed description of the actual circuit implementation of the embodiment illustrated in FIG. 2 will be provided later in this disclosure in connection with the schematic diagrams provided in FIGS. 6-9.

As mentioned previously, when the CPU (not shown in FIG. 2) desires to access a memory location, the logical address is presented to memory management system 18 by the CPU (see FIG. 1). A logical address represented by a 32-bit word, may range from logical address $0_{10}$ to logical address $4,294,967,295_{10}$. However, such a large range of logical addresses are seldom needed by a process, so logical address bits A30 and A31 may be set aside for purposes other than specifying a logical address.

In the presently preferred embodiment logical address bits A30 and A31 are used by the computer system managing software to make memory accesses to main memory and also carry out other system level functions. With a 30-bit (A0-A29) logical address capability, the presently preferred embodiment can access $1,073,741,824_{10}$ logical memory locations (1 GByte).

As will be recalled, it is the usual practice when implementing a memory management system in a computer system to divide the memory space into groups referred to as pages. In physical memory, either main memory or secondary memory, a group of continuous memory locations which store a page of data is referred to as a frame. Thus, bits F0-F16 in each translation entry are referred to as frame pointers 140A and 140B for reasons which will become clear later in this disclosure.

In the presently preferred embodiment each page includes 2048 bytes (2 KBytes). Data is moved into and out of main memory in increments of one page. Thus, if the CPU desires to access a particular byte, which is not in the main memory but is located in the secondary storage, it is necessary to move the complete page containing the byte from the secondary storage into the main memory.

It will be appreciated that a page size greater than or less than 2 KBytes can be chosen for use with the present invention. However, altering the page length would require modification of the presently preferred embodiment. It has been determined that a page size of 2 KByte is currently the most preferred page size.

With an understanding that an entire page of data is moved from secondary storage to the main memory, it can now be appreciated that only one translation table entry is required for each page in the main memory since only entire pages are moved into the main memory. However, due to the fact that the translation memory is an associative translation memory, the number of pages which may be accessed by the memory management system is greater than the number of entries in the translation memory ($16,384_{10}$).

FIG. 2 will continue to be referred to in order to explain the specific functions of each of the fields in the logical address. Since the memory space in both the main memory and secondary storage are divided into 2 KByte pages, any location within a page may be specified by an 11 bit address field. Offset field bits A0-A10 provide the 11 bits necessary to specify any particular memory location within any 2 KByte page.

Because the offset field only specifies one location within a 2 KByte page, the offset field does not undergo any translation by memory management system 18 and is passed directly on to frame multiplexor 150, as indicated by line 114 in FIG. 2. However, the main memory requires that the remaining bits of the logical address be translated into a physical address in order to identify the location of the page within the main memory. During the translation process, if the desired page is contained within the main memory, and thus has a corresponding entry within the translation memory, a "hit" occurs. If the desired page is not contained within the main memory, such an occurrence is referred to as a "miss" and a page fault is said to have occurred.

As shown in FIG. 2, each translation table entry is provided with a frame pointer, generally designated 140A or 140B, a tag, generally designated 138A or 138B, and validate and protect (VP) bits, generally designated 142A or 142B. It is important to note that, as described previously in connection with FIG. 1B, the computer system managing software is able to load the proper frame pointer 140A or 140B, tag 138A or 138B, and VP bits 142A or 142B into each translation table entry for reasons which will be explained shortly.

The validate and protect (VP) bits 142A and 142B are used to indicate the "state" of the translation table entry. The state may either be invalid (containing no valid information such as when the memory management system is first "powered up") or valid (indicating that tag and frame values have earlier been placed in the entry).

The VP bits may also indicate that the page associated with the entry is user write protected thus preventing any user program from writing to that page. The state may also be fully write protected which prevents both user programs and the computer system managing software from writing to that location in the main memory, which may be desirable if some code essential to the system managing software itself is contained in those pages.

For example, one state which can be indicated by the two bit VP field is that the translation table entry is both valid and unprotected and thus may be used for translation of a logical address to a physical address and also indicating that the associated page may also be written to as desired by the CPU. The various bit patterns representing each of the four combinations of states is provided below in Table I.

TABLE I

| State | VP31 | VP30 |
|---|---|---|
| Invalid | 0 | 0 |
| User-Write Protected | 0 | 1 |
| Fully Write Protected | 1 | 0 |
| Valid - Unprotected | 1 | 1 |

As mentioned previously, the offset field 104 indicates the offset position of the desired memory access from the first memory location of each page contained in main memory. Frame pointer 140A or 140B of the translation table entry contains the remaining most significant bits of the physical address which correspond to the location of the desired page in the main memory.

Thus, offset field 104 of the logical address contains the least significant bits of the physical address while frame pointer 140A or 140B in the selected translation table entry provides the most significant bits of the physical address. Together, offset field 104 and the selected frame pointer, 140A or 140B, provide 28 bits of physical memory address which is sufficient to identify one location in $268,435,456_{10}$ memory locations (256 MBytes).

Thus, as indicated previously, the two-way set associative translation memory utilized by the presently preferred embodiment allows more main memory to be accessed than there are entries in the translation memory, i.e., up to 256 MBytes.

As will be appreciated from the foregoing, a major task of the memory management system of the present invention is to identify the appropriate frame in the main memory which contains the byte designated by the logical address received from the CPU. In order to accomplish this task, page field 106, volume/page field 108, and volume field 110, are used.

As shown in FIG. 2, page field 106 and volume/page field 108 together include 14 bits. Page field 106 and volume/page field 108 together are used to select one translation table entry. Volume/Page field 108 is designated such because these eight bits may be defined as part of either volume field 110 or page field 106. With a potential total of 14 bits of "page" address, it is possible to identify one of 16,384 (0–16,383) translation table entries (e.g., entry pairs) with each translation table entry identifying one frame in the main memory.

According to the present invention, the presently preferred embodiment allows the translation table entries to be partitioned into groups. The translation table entry partitioning (grouping) in the presently preferred embodiment may range from 256 groups of 64 translation table entries (each entry representing a 2 KByte page in main memory) up to a translation table which is provided with no partitioning (i.e., one group of 16,384 translation table entries).

The size of a group formed by such partitioning determines the size of a "volume" of logical address space. The size of the volume is equal to the product of the number of translation memory entries in a group and the number of memory locations in a page. In the presently preferred embodiment, a volume may be as small as 128 KBytes (64 entries) or as large as 32 MBytes (16,384 entries).

It is important to note that the insertion of the proper frame pointer value in each translation table entry, according to the present invention, is a task assigned to the computer system managing software. Furthermore, the system managing software also inserts the appropriate values in tag 138A or 138B of the translation table entry. In FIG. 2, it should be noted that tag bits T17–T29 correspond to the volume/page field 108 and the volume field 110 (bits A17–A29) of the logical address from the CPU.

In order to determine whether a selected translation table entry contains the proper value in frame pointer 140A or 140B (which can then be concatenated with offset field 104 in the logical address 102 to provide a physical address in the main memory) tag 138A or 138B of the selected translation table entry is compared to the bits in volume field 110 and volume/page field 108 (together comprising bits A17–A29) of the logical address. This comparing function is carried out by the tag comparators represented by blocks 148A and 148B in FIG. 2.

It will be appreciated that since volume/page field 108 and volume field 110 make up the most significant address bits in logical address 102, a tag 138A or 138B incorporating the value of these bits ensures that only the proper translation table entry (with the proper frame field, 140A or 140B) will be concatenated with the offset field when the logical address is presented to memory management system 18.

The bits contained within volume/page field 108 and volume field 110 are presented to tag comparators 148A and 148B by way of buses represented by lines 118 and 120. The bits contained within the tags 138A or 138B are presented to tag comparators 148A or 148B by way of buses represented by lines 144A or 144B, respectively.

If the value contained in tags 138A or 138B of the selected translation table entry is equivalent to (i.e., matches) bits A17-A29 in logical address 102, it is assured that the corresponding frame pointer 140A or 140B of the translation table entry contains the most significant bits for the desired physical address in main memory.

It is important to note that in the presently preferred embodiment, the computer system managing software writes a bit pattern duplicating logical address bits A17-A29 as the tag of the translation table entry (bits T17-T29 in FIG. 2). Furthermore, the presently preferred embodiment always compares logical address bits A17-A29 with tag bits T17-T29 to determine if the selected translation table entry is a hit. However, many other arrangements could be used to carry out the present invention.

It should also be noted that in the presently preferred embodiment logical address bits A30 and A31 are used to allow the CPU to "bypass" the memory management system and make direct accesses to main memory. Those skilled in the art will appreciate that other schemes could be devised to allow the CPU to directly access main memory.

As mentioned previously, the present invention may be practiced utilizing a single translation table or a number of translation tables. In the presently preferred embodiment diagrammed in FIG. 2, two translation tables are provided. By incorporating two translation tables, 136A and 136B in the presently preferred embodiment, the number of misses which occur can be greatly reduced while only doubling the number of translation table entries which must be provided.

Each entry in each translation table 136A and 136B may be individually written to by the system managing software. Thus, by utilizing two translation tables 136A and 136B whose tags are simultaneously compared using comparators 148A-148B, it is possible to simultaneously map to as many as 32,768 pages in main memory (representing a memory space of 64 MBytes).

By utilizing a two-way translation memory it is possible to greatly reduce the problem which may be referred to as "high-frequency mapping collisions," hereinafter referred to as "mapping collisions." Mapping collisions occur when the CPU desires to alternately request logical addresses which are spaced apart by an integral multiple of volume size.

If only one translation table were incorporated into the translation memory, when the CPU alternatively requests logical addresses which are spaced apart by an integral multiple of the volume size, a miss would also occur on every memory access thus greatly reducing the speed of the computer system. By providing two translation tables i.e., a two-way translation memory, each of the two pages containing the memory locations spaced an integral multiple of the volume size apart can be provided with its own translation table entry.

However, both entries in the pair must be considered as an indivisible unit to the memory management system since the same translation memory address accesses both entries and both are simultaneously compared to determine which entry in the two tables has the proper tag value and thus also contains the proper frame pointer. Thus, as explained previously, the term "entry" is intended to include in its meaning two or more corresponding entries in an N-way translation memory.

As stated earlier, a hit occurs if either of the selected translation table entries contains the proper tag. If, for example, the entry located in translation table A at translation memory address 0 contains the proper value as its tag 138A (T17-T29), then the frame pointer/offset field multiplexor, represented by block 150 in FIG. 2, uses the frame pointer 138A of the selected translation memory entry as the most significant bits of the translated (physical) address and then concatenates the frame pointer bits (F0-F16) with the offset field bits (A0-A10) of the logical address 102 to derive a 28 bit translated (physical) address which is then presented to the main memory on a bus represented by line 152.

By using the architecture of the presently preferred embodiment of the present invention as previously described, it is possible to provide a memory management system which is capable of very rapidly translating a logical address presented by a CPU to a physical address which identifies a specific location in the main memory. It will be appreciated that the computer system managing software necessary to carry out the proper control of the various structures previously described, and the placement of the proper values within those structures, may take various forms.

For example, a popular operating system known as UNIX ® Version 4.2 BSD may be readily adapted for use with the present invention according to the previously provided explanations. Information concerning the UNIX ® operating system may be found in the publications: Waite, Martin, and Prata, *The UNIX Primer Plus* published by Howard W. Sams (1983) and Groff and Urinberg, *Understanding UNIX* published by Que Corporation (1983). The UNIX ® Version 4.2 BSD source code is available from University of California, Berkeley under a license from American Telephone & Telegraph. Both the The *UNIX Primer Plus* and *Understand UNIX* publications and the UNIX ® version 4.2 BSD source code are incorporated herein by reference.

As stated earlier, prior to the present invention there was not available a memory management system which could make efficient use of the translation memory since each process was allocated a fixed number of translation memory entries in which to map logical addresses to physical addresses. Thus, in accordance with the present invention, the presently preferred embodiment provides a system and a method to dynamically configure the translation memory into groups in order to provide each process with groups containing an optimum number of translation memory entries. Examples of how the translation memory may be configured are provided below.

As mentioned previously, a mask register and a base register are provided in the presently preferred embodiment. The mask register is represented by block 126 in FIG. 2 (including bits M0-M7). The base register is represented by block 122 in FIG. 2 (including bits B0-B7). Also, a translation memory address multiplexor, represented by block 130 in FIG. 2, is provided. These structures allow the system managing software to carry out the important function of reconfiguring the translation memory without altering any hardware or abnormally interrupting execution of the processes being executed.

As will be recalled, it is an object of the present invention to partition the translation table entries, each entry representing a page of data in main memory, into variable size groups according to the needs of the particular processes being executed by the computer system. In order to explain how the presently preferred embodiment carries out this function of varying the size of the groups, reference will be made to FIGS. 2, 3A-3C, as well as to FIGS. 4A-4B.

Figures 4A, 4B:
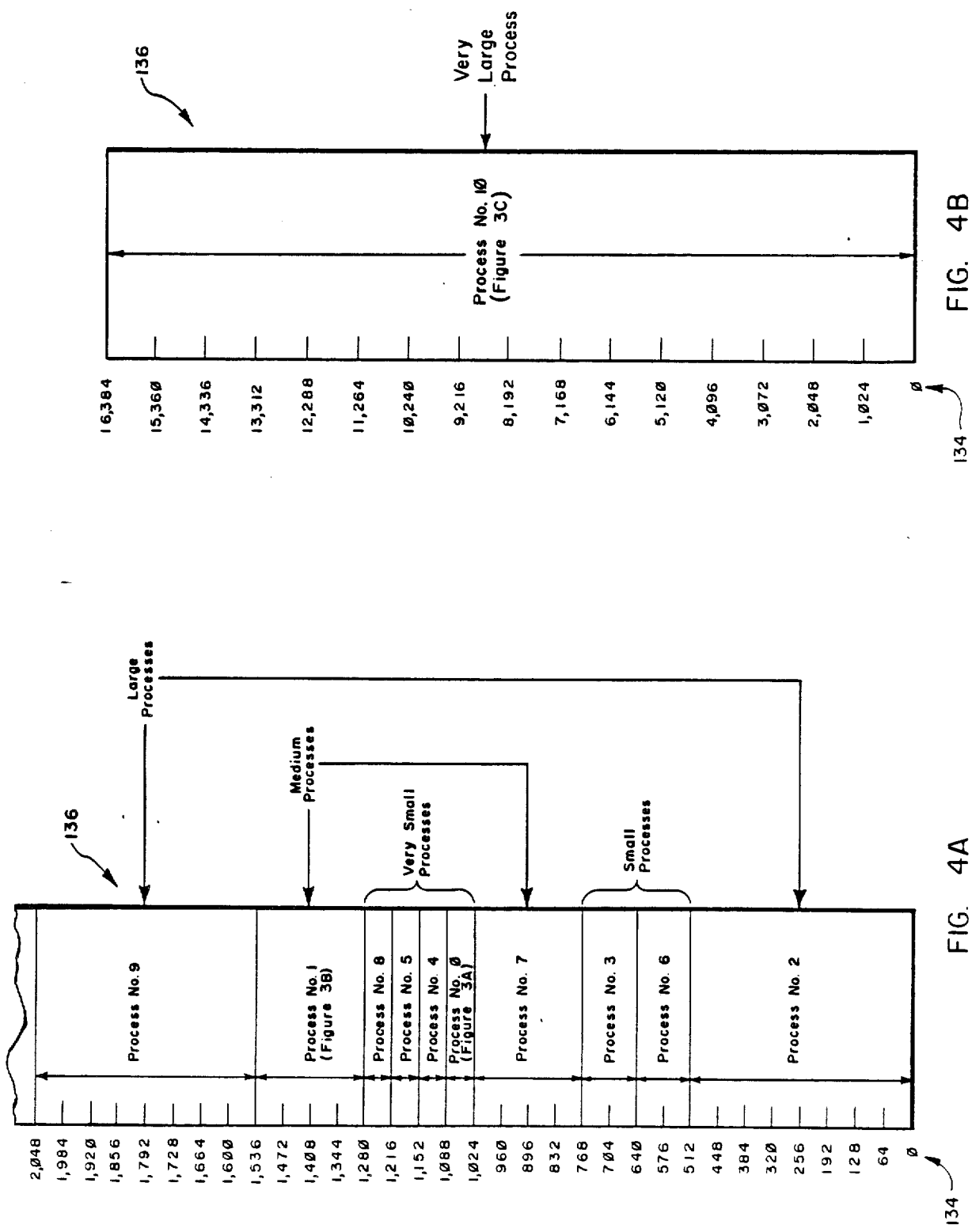
FIGS. 4A–4B are diagrams indicating possible allocations of translation memory accrding to the present invention.

FIG. 4A is an example of one possible configuration of a portion of translation memory 136. In the presently preferred embodiment the configuration of both translation tables must be identical. As indicated earlier, the smallest group possible with the presently preferred embodiment described herein is a group of 64 translation memory entries. However, embodiments can be devised which do not have such a limit on the minimum size of the groups. In FIG. 4A, each incremental mark (generally designated 134 and corresponding to translation memory addresses 134 in FIG. 2) represents 64 translation table entries, i.e., the smallest possible group. The translation memory 136 may contain up to 256 groups of 64 entries each.

As explained earlier, the present invention is particularly adapted for use in computer systems involved in multiprocessing. In order to best explain the dynamic configuration of translation memory 136, the translation memory 136 in FIG. 4A has been configured to show a representative number of processes, numbered No. 0 through No. 9, which are each allocated groups in translation memory 136.

According to the configuration of translation memory 136 illustrated in FIG. 4A, very small processes (Nos. 0, 4, 5, and 8) are allocated the smallest possible group, i.e., 64 translation table entries. Small size processes (Nos. 3 and 6) are allocated groups of 128 entries each. Medium size processes (Nos. 1 and 7) are allocated groups each including 256 translation table entries. Large size processes (Nos. 2 and 9) are each allocated groups 512 translation table entries large.

FIG. 4B shows translation memory 136 configured to provide the largest possible group size, one group of 16,384 translation table entries, for a very large size process (No. 10). Such a very large process would generally not be encountered in normal applications. However, if necessary due to a process which requires rapid access to a very large number of memory locations, the versatility of the presently preferred embodiment allows the configuration shown in FIG. 4B.

Importantly, the present invention allows the system managing software to change the size of the group for a particular process as the memory requirements for that process change. It is important to appreciate that in all previously available memory management systems, the configuration shown in FIG. 4A would not be allowed. That is, in the previously available systems, all processes, whether requiring a large number of translation table entries or a small number of translation table entries for efficient operation, would all be allocated the same size group, i.e., the same number of translation table entries. In actual operation, the computer system managing software will utilize the appropriate group in the translation table as it turns its attention to the particular processes corresponding to that group. As stated earlier, up to 256 groups of 64 entries each are possible with the presently preferred embodiment.

It is the function of the base register, represented by block 122 in FIGS. 2 and 3A-3C, to allow the computer system managing software to convey to memory management system 18 the translation memory address 134 at which the group for the particular process begins. It is the function of the mask register, represented by block 126 in FIGS. 2 and 3A-3C, to allow the system managing software to convey to memory management system 18 the number of entries to be included in the group for a particular process. FIGS. 3A-3C will be used to explain how the system managing software utilizes mask register 126 and base register 122 according to the present invention.

For example, if a group begins at translation memory address 0, then base register 122 in FIG. 2 would be loaded with all zeros. Similarly, if a 64 entry group began at translation table entry 64, the B0 bit in base register 122 would be set. The sequence potentially can continue until all bits in base register 122 (B0-B7) are set indicating that the selected group begins at the 255th group in the translation memory with each group containing 64 translation table entries. As stated previously, the computer system managing software stores and recalls the location of the beginning translation memory address for the particular group desired and conveys this in base register 122 shown in FIG. 2.

FIGS. 3A, 3B, and 3C each show a possible bit pattern for base register 122 and mask register 126, each of the figures corresponding to one of the processes (Nos. 1-10) represented in FIGS. 4A and 4B. As indicated in FIG. 3A, when none of the bits in the mask register are asserted, i.e., M0-M7 are all set (negative logic), then page field 106A is defined as consisting of only logical address bits A11-A16. Thus, only a group of 64 translation table entries (the maximum number identifiable with six bits) is allowed. Furthermore, base register 122 in FIG. 3A is shown loaded with $16_{10}$ ($10000_2$). With all the bits in the mask register 128 set, and the fifth bit in base register 122 set (i.e., B4 set), then the translation table address multiplexor 130 (shown in FIG. 2) selects the address in the translation memory which is the sixteenth integral multiple of 64 entries, i.e., the sixteenth group of entries each.

With the mask and base register bit arrangements shown in FIG. 3A, the translation entries allocated for Process No. 0 in FIG. 4A is selected. Still further, if all bits in page field 106 (A11-A16) of logical address 102 are cleared the first translation memory entry, of the 64 allocated for Process No. 0, would be selected.

However, when the CPU desires to switch contexts, for example, to switch from Process No. 0 to Process No. 1 (a medium size process) as represented in FIG. 4A, it is necessary for the CPU to load a different bit pattern into base register 122 and mask register 126 as represented in FIG. 3B. Importantly, it should be appreciated that the partitioning of the translation memory may be altered as various processes are activated or inactivated.

For example, as is the case with all processes represented in FIG. 4A, Process No. 1 may have been a previously active process (and thus translation memory for Process No. 1 may have been previously allocated). Alternatively, Process No. 1 may have just been activated for the first time (thus, the locations in the translation memory for Process No. 1 may have just been allocated). Still further, the system managing software is able to deallocate translation memory allocations assigned to any particular process or processes. The attribute of the present invention of allocating space in the translation memory "on the fly," i.e., dynamically, is a major advantage.

As just stated, when Process No. 1 shown in FIG. 4A is to be selected, the CPU loads the bit patterns shown in FIG. 3B into base register 122 and mask register 126. In FIG. 3B, a $11111100_2$ has been loaded into mask register 126 to indicate that the volume size is to be 256 translation entries.

It will be appreciated that since a group of 256 translation table entries is now allocated to Process No. 1, it is necessary that the page field, 106B in FIG. 3B, be redefined to include bits A11-A18 (8 bits being necessary to specify 256 entries in the group allocated for Process No. 1). Conversely, volume field 110B is redefined to only include logical address bits A19-A29.

Also as represented in FIG. 3B, a $20_{10}$ ($10100_2$) is loaded into base register 122. Setting bits B2 and B4 in base register 122 causes translation memory address multiplexor (130 in FIG. 2) to select translation memory address $1280_{10}$ as the beginning address of the group for Process No. 1. This address is the 20th multiple of 64 which is indicated by loading a $20_{10}$ into base register 122. Further, since only 6 bits are necessary to identify 64 groups of 256 entries each, the two least significant bits in base register 122 may be regarded as "don't care" (indicated by the X in both B0 and B1).

Thus, it will be appreciated that the base register can be thought of as indicating a base index position within the translation memory, i.e., a beginning translation memory address for the group. The page field of the logical address is then used to specify the location within the group, i.e., the distance "above" the initial translation memory address for the group. Similarly to the example described using FIG. 3A, if bits A11-A18 of logical address 102 in FIG. 3B are all cleared, the first translation table address found in the group allocated for Process No. 1 will be selected.

The above-described system of the presently preferred embodiment for allocating translation memory locations can allow the entire translation memory to be allocated for a single process. Such a situation is represented by the bit patterns shown in FIG. 3C and the translation memory allocation represented in FIG. 4B for Process No. 10, a very large process.

As shown in FIG. 3C, since all the bits in mask register 126 are cleared, all of the bits used to form the address of the desired translation memory entry are derived from the logical address. Thus, page field (106C in FIG. 3C) is defined as including logical address bits A11-A24 (14 bits), enough bits to specify one translation memory address out of 16,384. Further, since the translation memory is not partitioned, i.e., the entire translation table is allocated to just one group, all the bits in base register 122 (B0-B7) are designated "don't care." The translation memory configuration illustrated in FIG. 4B results from the bit patterns shown in FIG. 3C.

In summary, the smallest group into which the translation memory of the presently preferred embodiment may be partitioned is 64 translation entries with the groups increasing in size by binary integral powers up to a group which contains all 16,384 translation memory entries. Provided below in Table II is a summary of the possible configurations of translation table entries according to the presently preferred embodiment.

TABLE II

| Number of Translation Table Entries Allocated for the Process | Number of Bits Defining Page Field (Logical Address Bits Defined as Page Field) | Number of Bits Defining Volume Field (Logical Address Bits Defined as Volume Bits) | Bit Pattern Loaded into the Mask Register M7   M0 |
|---|---|---|---|
| 64    | 6 (A11–A16)  | 13 (A17–A29) | 1 1 1 1 1 1 1 1 |
| 128   | 7 (A11–A17)  | 12 (A18–A29) | 1 1 1 1 1 1 1 0 |
| 256   | 8 (A11–A18)  | 11 (A19–A29) | 1 1 1 1 1 1 0 0 |
| 512   | 9 (A11–A19)  | 10 (A20–A29) | 1 1 1 1 1 0 0 0 |
| 1024  | 10 (A11–A20) | 9 (A21–A29)  | 1 1 1 1 0 0 0 0 |
| 2048  | 11 (A11–A21) | 8 (A22–A29)  | 1 1 1 0 0 0 0 0 |
| 4096  | 12 (A11–A22) | 7 (A23–A29)  | 1 1 0 0 0 0 0 0 |
| 8192  | 13 (A11–A23) | 6 (A24–A29)  | 1 0 0 0 0 0 0 0 |
| 16384 | 14 (A11–A24) | 5 (A25–A29)  | 0 0 0 0 0 0 0 0 |

Those skilled in the art will appreciate that computer system managing software, such as the UNIX ® operating system, can be readily adapted for use with the embodiment described herein. The flow chart of FIG. 1B and the source code contained in Appendices A and B indicate what tasks must be carried out by an operating system.

In order to most clearly describe the operation of the presently preferred embodiment, the method of the presently preferred embodiment will now be described in connection with the flow chart of FIG. 5.

Figure 5:
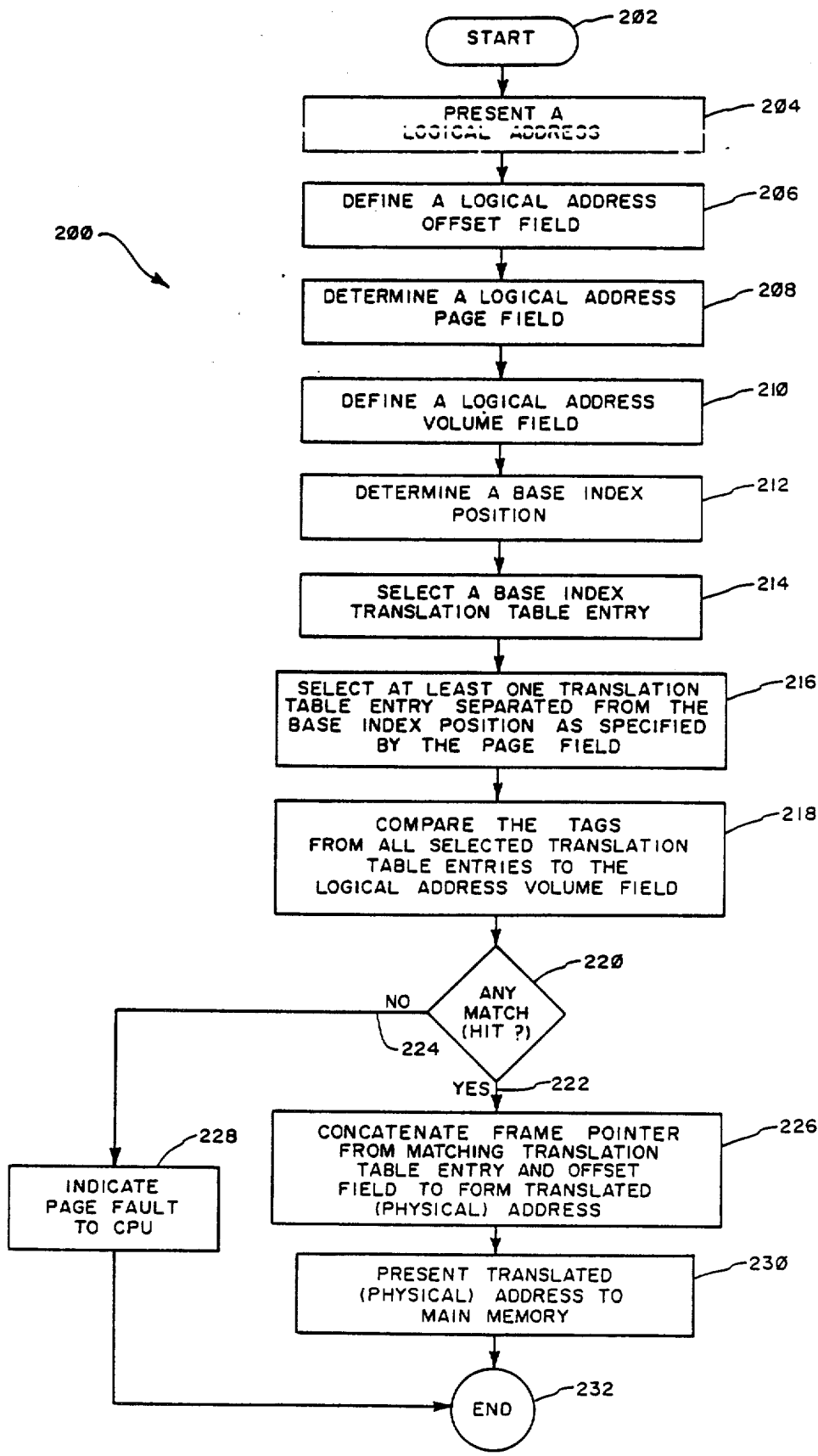
FIG. 5 is a flow chart indicating the steps of the presently preferred method of the present invention.

Flow chart 200 illustrated in FIG. 5 begins at the symbol marked 202 and labeled "start." In the presently preferred embodiment, at the starting point, the CPU (10 in FIG. 1) is completing an operation and will require that data be presented to it in order to continue the next step in the currently active process. Then, as represented by at 204, the CPU presents a logical address to the memory management system 18 of the present invention.

An offset field in the logical address is next defined, as represented at 206. In the presently preferred embodiment, the logical address offset field is fixed in size and consists of bits A0–A10 (11 bits). However, it is possible to devise embodiments within the scope of the present invention using a different size offset field, or using different bits within the logical address, or even eliminating the offset field altogether.

The next step, represented by the symbol marked 208, is the defining of a logical address page field. As will be appreciated from the previous discussion, the purpose of the page field is to specify a translation memory address within a group. In the presently preferred embodiment, the page field will comprise at a minimum logical address bits A11–A16 and, at a maximum, will comprise logical address bits A11–A24.

In the next step, indicated at the symbol marked 210 in FIG. 5, a volume field in the logical address is defined. It will be appreciated that in the presently preferred embodiment, as the page field is expanded to include a greater number of bits, thus being capable of specifying a greater number of entries within a given group, the volume field will decrease a corresponding number of bits. However, those skilled in the art will appreciate that other schemes for varying the number of pages allocated to each group could be used to implement the present invention. Thus, it is not essential to the present invention that the particular above-described relationship between the page field and the volume field exist.

After the offset, page, and volume fields of the logical address are defined, a base index position is provided by the system managing software as herein before explained. This step is represented at 214 in FIG. 5. As will be appreciated from the foregoing description, the base index translation entry, which may also be referred to as a "coarse index position," is located at the translation memory address which is specified by the bit pattern placed in the base register. The base index position indicates the address of the first entry in any particular group of translation memory entries.

After a base index position has been determined, the base index translation entry is selected, as represented at 214 in FIG. 5. Next, a specific translation table entry, which is a number of entries "above" the base index position, is selected. This step, represented by the symbol marked 216 in FIG. 5, would, for example, after the 64$_{10}$th base index entry was selected, and the page field, for example having a value of 10$_{10}$, cause the "selection" of translation memory address 74$_{10}$.

Once a translation memory address is specified, the tag fields, represented in FIG. 2, of all of the translation table entries specified by the translation memory address are simultaneously compared to the volume field in the logical address. This step is represented at 218 in FIG. 5.

A decision is then made which is represented by the symbol 220. If the tag of any of the selected translation memory entries matches the volume field of the logical address, a hit has occurred (indicated by the "yes" alternative 222). If a hit has occurred, the presently preferred embodiment concatenates the frame pointer from the matching translation table entry and the offset field from the logical address to form a translated (physical) address. The just-described concatenation step is represented at 226 in FIG. 5.

After the frame pointer and the page field have been concatenated to form a translated (physical) address, that same translated (physical) address is presented to main memory as represented at 230. The immediate task of the memory management system is then completed, as represented by the symbol marked 232 and labeled "end."

If no hit occurs at symbol 220 (represented by the "no" alternative 224), the memory management system of the presently preferred embodiment indicates to the CPU that a page fault has occurred as represented by block 228. The immediate task of the memory management system has then been completed and the CPU, in connection with the computer system managing software, takes the appropriate action to see that the proper page is moved into the main memory and the CPU may then present the same logical address to the memory management system and a hit will occur.

DESCRIPTION OF THE CIRCUIT IMPLEMENTATION OF THE PRESENTLY PREFERRED EMBODIMENT—FIGS. 6–9

In FIGS. 6–9, and the discussion which accompanies these figures, the reference numeral designations which are commonly used in the art on schematic diagrams of digital circuits has been retained in order to make these figures most understandable. Furthermore, the customary indications of integrated circuit device pinouts, device input/output functions, device type designations, and bus and signal conductor paths and connections have also all been retained in order to provide maximum clarity.

Regarding the device type designations, the prefix "74" often associated with device designations of the components used herein has been omitted. However, those skilled in the art will readily recognize the device designations as shown in the Figures. Furthermore, the slash symbol ("/") following a signed name indicates the signal is "low asserted." The "/" symbol may be considered equivalent to the "bar symbol" customarily used to indicate a "low asserted" signal.

It will be appreciated that, given the circuit schematics of the presently preferred embodiment as provided in FIGS. 6–9, the fabrication of the circuit of the presently preferred embodiment, and also its incorporation into a computer system, may readily be accomplished by those skilled in the art.

3. Description of the Circuit Implementation of the Base Register, Mask Register, and Translation Memory Address Multiplexor of the Presently Preferred Embodiment—FIG. 6.

Figure 6:
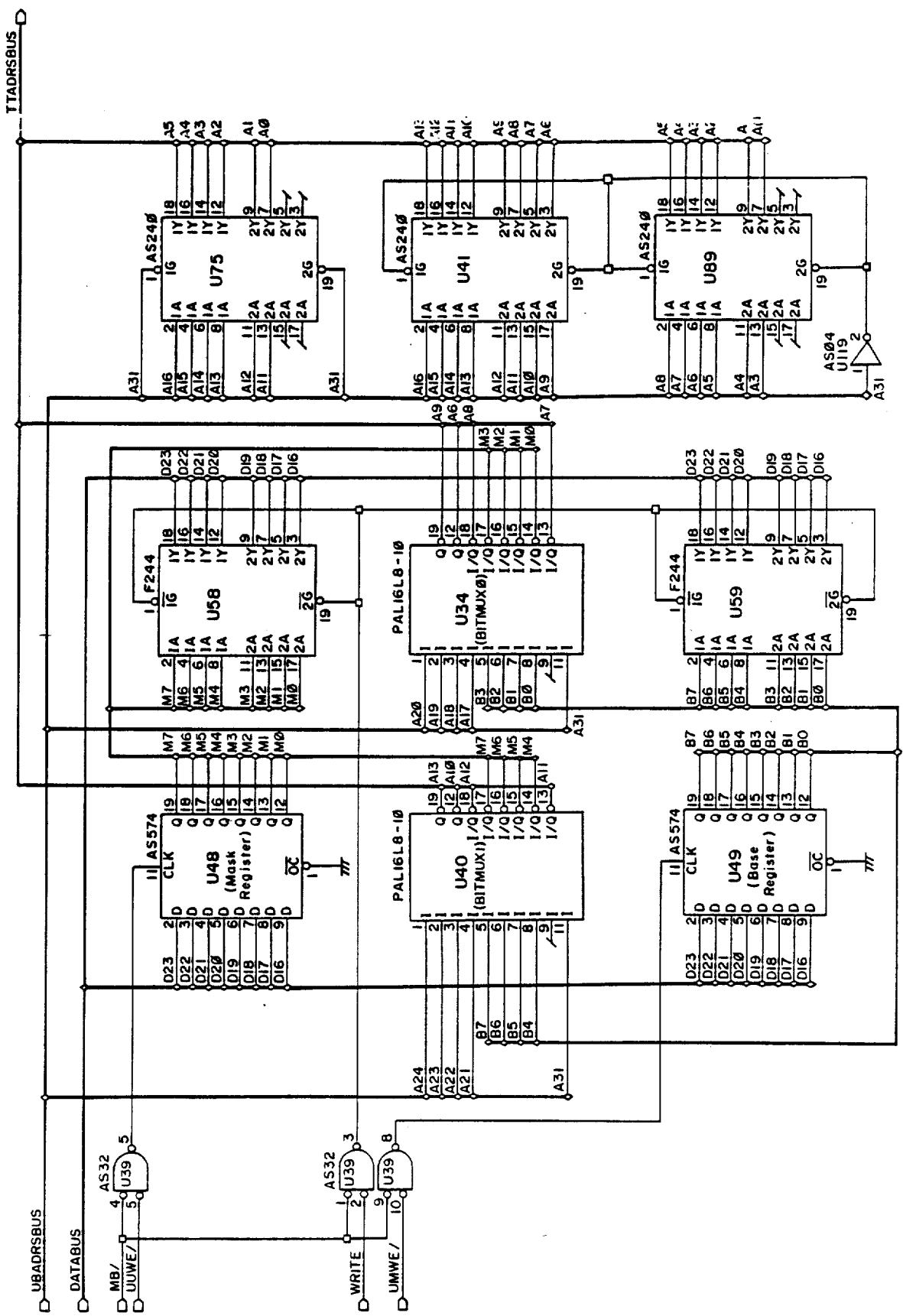
FIG. 6 is a detailed schematic diagram showing a circuit implementation of the translation memory address multiplexor circuit of the presently preferred embodiment of the invention.

FIG. 6 contains a detailed schematic drawing of the presently preferred circuit implementation of the base register, mask register, and translation address multiplexor of the presently preferred embodiment of the present invention.

The device designated U48 functions as mask register 126 represented in FIG. 2. Device U48 of the presently preferred embodiment in FIG. 6 is of the type commonly known in the art as an AS574 and is described as an octal D-type edge-triggered flip-flop with 3-state outputs.

The device designated U49 in FIG. 6 functions as the base register 122 represented in FIG. 2. Device U49 is also an AS574 device generally described as an octal D-type edge-triggered flip-flop with 3-state outputs. Devices U48 and U49, each being 8 bit registers, are connected to data bus lines D16–D23, as shown in FIG. 6, and thereby may be loaded by the CPU.

The devices designated U58 and U59 in FIG. 6 are of the type generally designated in the art as F244 and are described as octal buffers/line drivers with 3-state outputs. U58 and U59 are used by the CPU to get the values contained within mask and base registers onto the data bus (DATABUS).

The device designated U75 in FIG. 6 is of the type generally designated in the art as AS240 and described as octal buffers/line drivers with inverting 3-state outputs. The function of device U75 is to act as the driver for the page field of the logical address.

The devices designated U41 and U48 in FIG. 6 are also of the type generally designated in the art as AS240 (octal buffers/line drivers with inverting 3-state outputs) and are used by the computer system managing software to perform read and write operations on translation table entries.

The devices designated U40 and U34 in FIG. 6 function as the translation address table multiplexor represented in FIG. 2. Devices U34 and U40 are programmable array logic (PAL) devices of the type commonly designated in the art as PAL16L8-10. Programmable array logic devices U40 and U34 perform the function of determining which bits in the base register U49 or logical address A17–A24 should be gated as the translation memory address.

PALS U34 and U40 are referred to as the BITMUX0 PAL and BITMUX1 PAL, respectively. The bit multiplexor (BITMUX) reference is indicative of the function of these PALs. PAL U40 (BITMUX1) provides the multiplexing function for the most significant 4 bits of the 8 selectable bits in the Translation Table Address Bus (TTADRSBUS). Each address bit can be selected to come from a bit in the Unbuffered Address Bus (UBADRSBUS) or from a bit in the base register. As explained previously, the selection is determined by a bit pattern in the mask register U48.

PAL U34 (BITMUX0) provides the multiplexing function for the least significant 4 bits of the 8 selectable bits in the Translation Table Address Bus (TTADRS-BUS). Each address bit can be selected from a bit in the Unbuffered Address Bus (UBADRSBUS) or from a bit in the base register. As is the case with PAL U40, the selection is determined by a bit in the Mask Register U48.

Each PAL device U40 and U34 may be programmed using techniques well known in the art such that each particular combination of inputs results in a predetermined output combination. Programming of the PAL devices may be greatly aided by use of a programming language such as PALASM available from Mololithic Memories, Incorporated located at Santa Clara, California.

The PALASM code for programming PAL U40 in the presently preferred embodiment is shown in Table III while the code for programming PAL U34 is shown in Table IV. Those familiar with the PALASM language will appreciate that in the code provided below the pinouts are sequentially assigned a label and the outputs are each provided with an equation, which if true, the output is asserted.

TABLE III

```
A3 A2 A1 A0 B3 B2 B1 B0 NC GND
/EN /Q0 /A1 M0 M1 M2 M3 /Q2 /Q3 VCC
IF (EN) Q3 = /M3 * A3 + M3 * B3
IF (EN) Q2 = /M2 * A2 + M2 * B2
IF (EN) Q1 = /M1 * A1 + M1 * B1
IF (EN) Q0 = /M0 * A0 + M0 * B0
```

TABLE IV

```
A3 A2 A1 A0 B3 B2 B1 B0 NC GND
/EN /Q0 /Q1 M0 M1 M2 M3 /A2 /Q3 VCC
IF (EN) Q3 = /M3 * A3 + M3 * B3
IF (EN) Q2 = /M2 * A2 + M2 * B2
IF (EN) Q1 = /M1 * A1 + M1 * B1
IF (EN) Q0 = /M0 * A0 + M0 * B0
```

Each of the PAL devices used in the presently preferred embodiment are of the same general type and the programming of each of the PAL devices will be provided herein using the code for the PALASM language.

As is customary in the art, the function of each signal or bus indicated in FIGS. 6–9 is provided below in a glossary for each figure. For the convenience of the reader, the signals and/or buses which appear in more than one figure will be repeated in the glossary for each figure even though the same function is served by the signal and/or bus. Also, as is customary in the art, a signal which is "low asserted" has associated with it a slash symbol ("/") in the following glossaries, tables, and FIGS. 6–9.

| GLOSSARY A (FIG. 6) | |
|---|---|
| Signal/Bus | Function |
| UBADRSBUS | Unbuffered Address Bus. Carries logical addresses from the CPU to the memory management system. Size is 32 bits, labeled A0 through A31. |
| DATABUS | Data Bus. Carries data to and from the CPU. Size is 32 bits, labeled D0 through D31. |
| MB/ | Mask Base Select Signal (low asserted). Generated by decode circuitry (not shown in FIG. 6) from a combination of address bits from the CPU. This signal asserts when the CPU reads or writes the Mask and Base Registers. |
| UUWE/ | Upper-Upper Write Enable signal (low asserted). Generated by decode circuitry (not shown in FIG. 6) when the CPU writes the most significant 8-bit byte of the Data Bus (D24 through D31). |
| WRITE | Write signal. Generated by the CPU when a write operation is performed. |
| UMWE/ | Upper-Middle Write Enable signal (low asserted). Generated by decode circuitry (not shown in Figure 6) when the CPU writes the second most significant 8-bit byte of the Data Bus (D16 through D23). |
| TTADRSBUS | Translation Table Address Bus. Provides address information to the Translation Memory. Size is 14 bits (labeled A0 through A13). |

It should be appreciated that the presently preferred embodiment shows just one possible arrangement for implementation of the base register, mask register, and translation memory address multiplexor. Many different architectures, whether using the same or different devices, can be designed by those skilled in the art to perform the required functions of the base register, mask register and translation memory address multiplexor.

4. Description of the Circuit Implementation of the Translation Tables of the Presently Preferred Embodiment—FIGS. 7A–7B.

Figures 1, 7A:
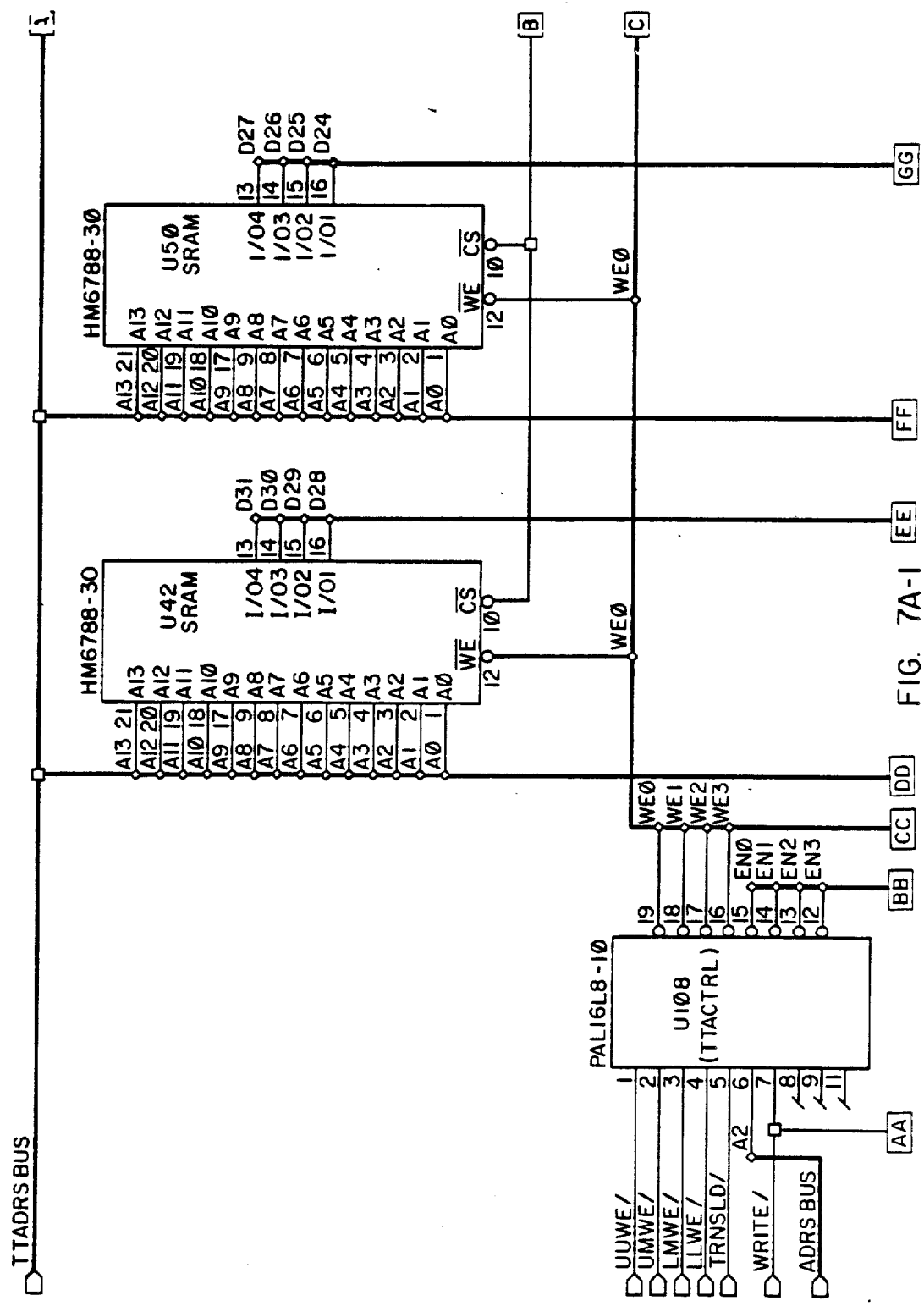
Figures 2, 7A:
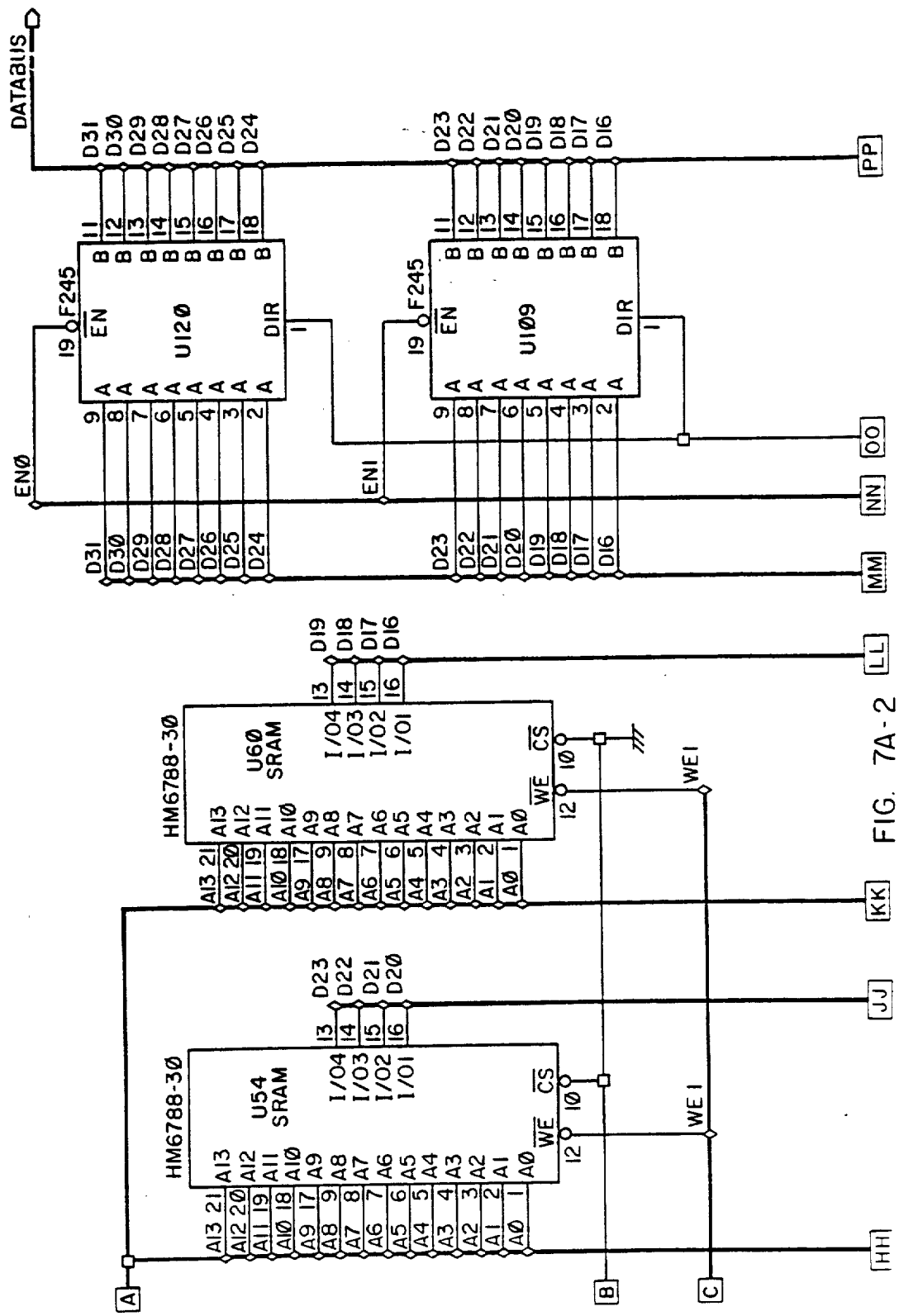
Figures 3, 7A:
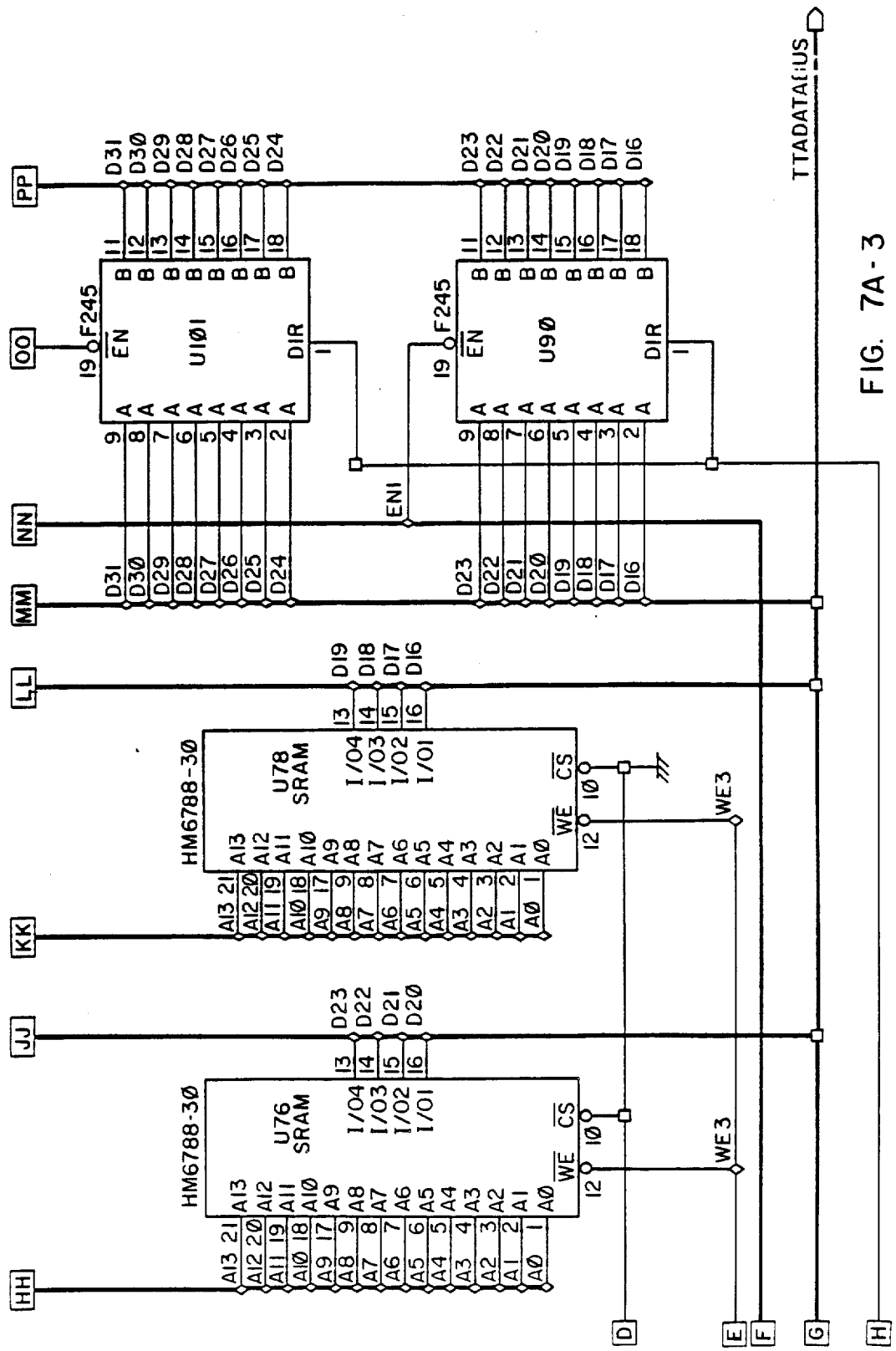
Figures 4, 7A:
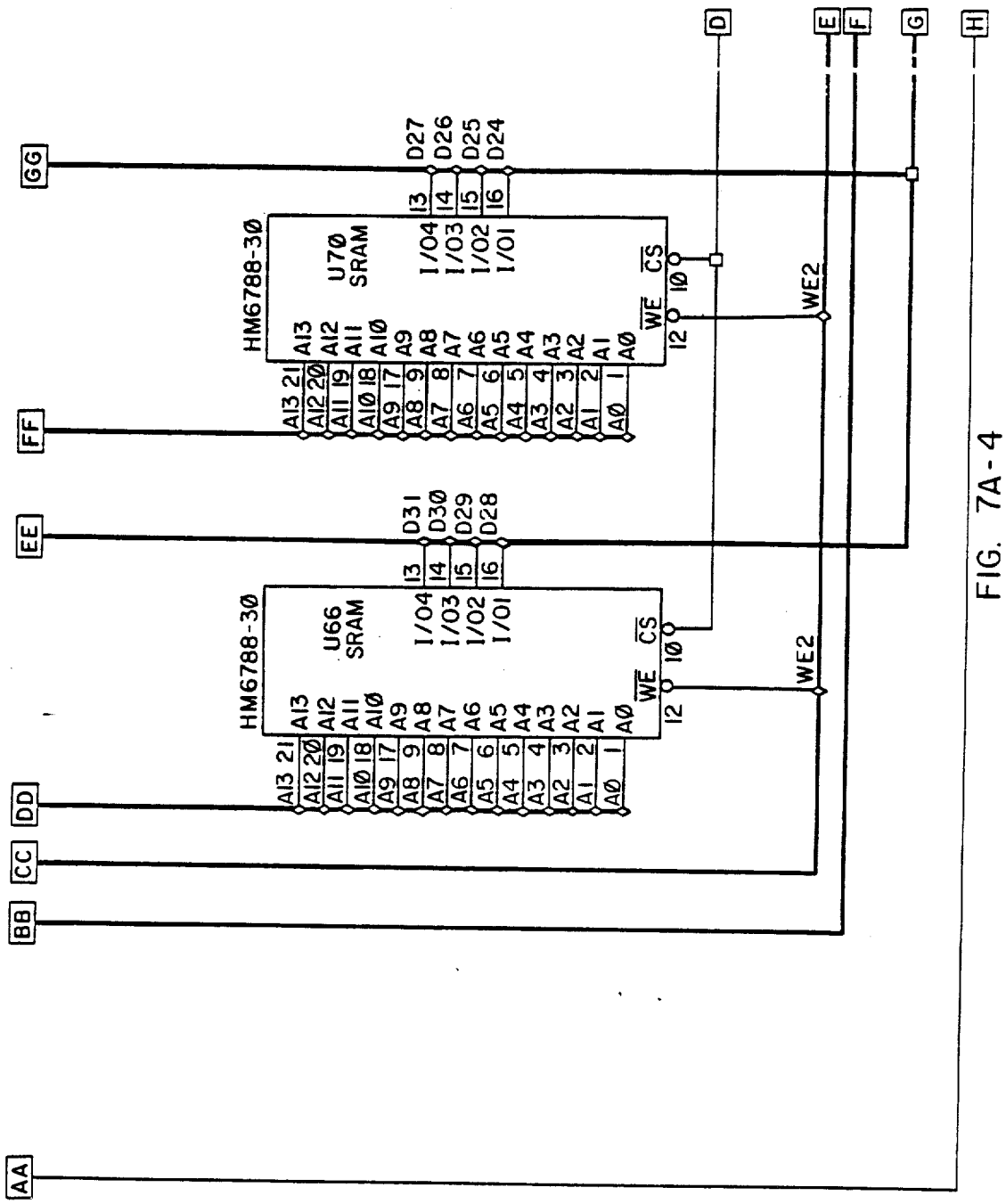
Figures 1, 7B:
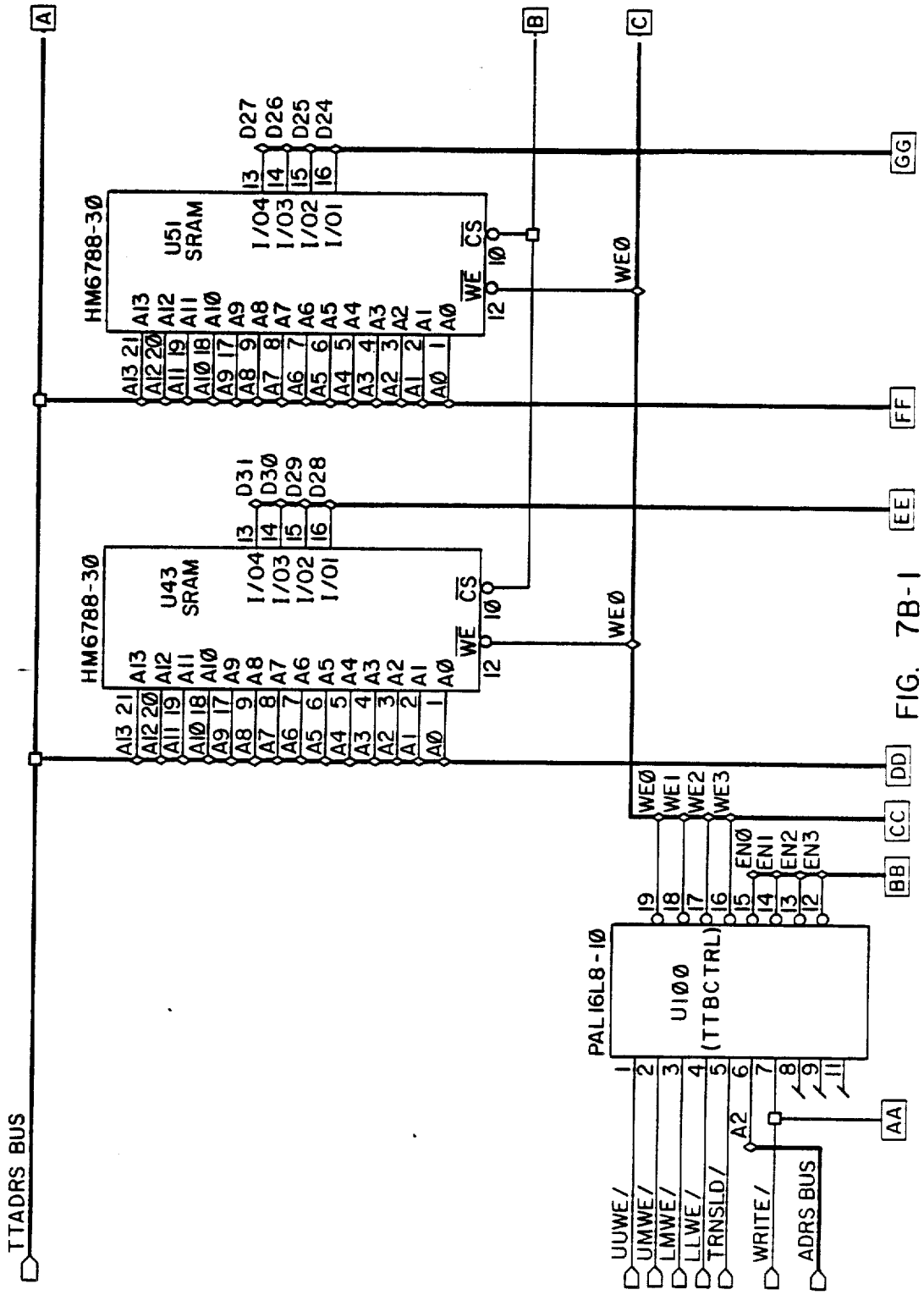
Figures 2, 7B:
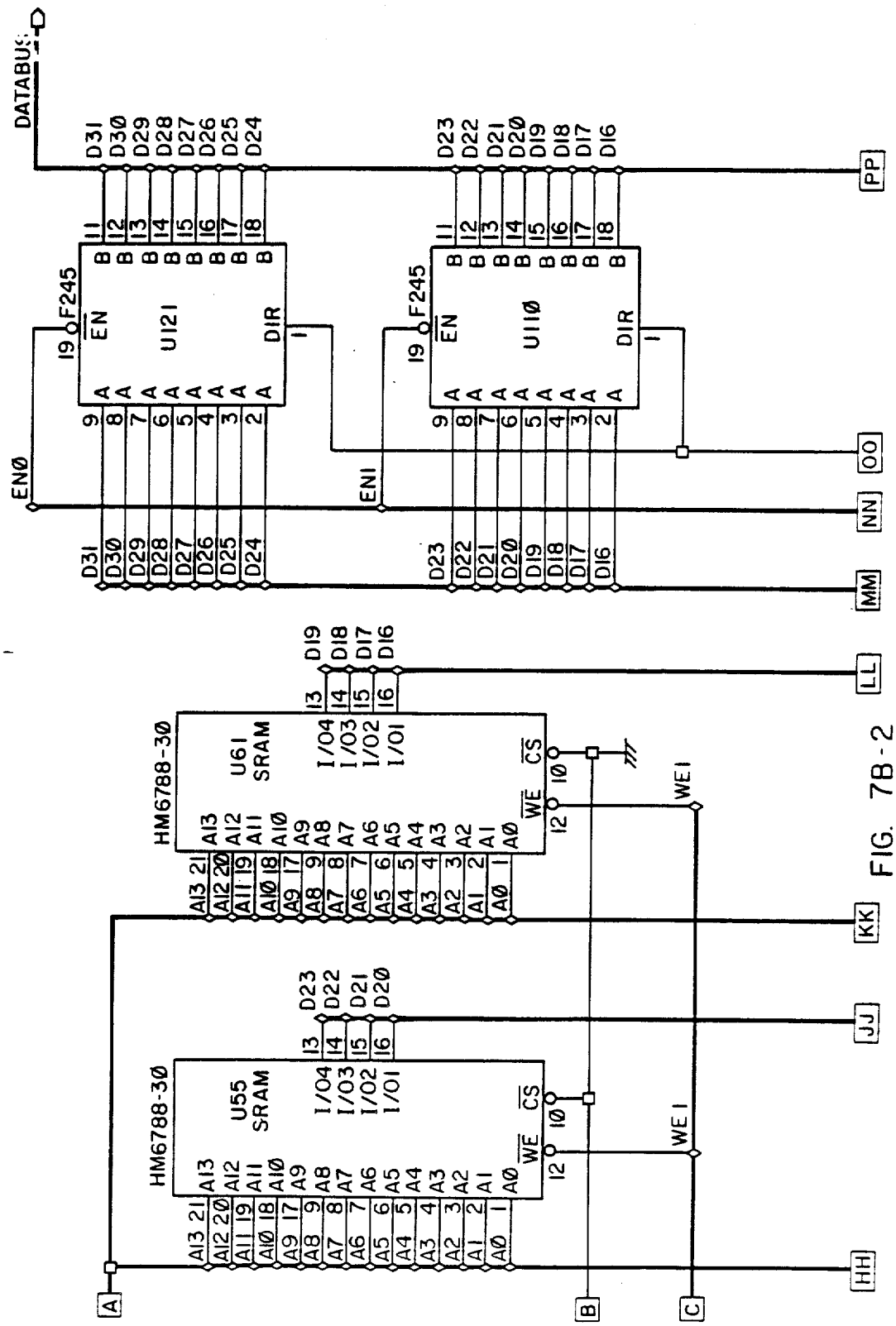
Figures 4, 7B:
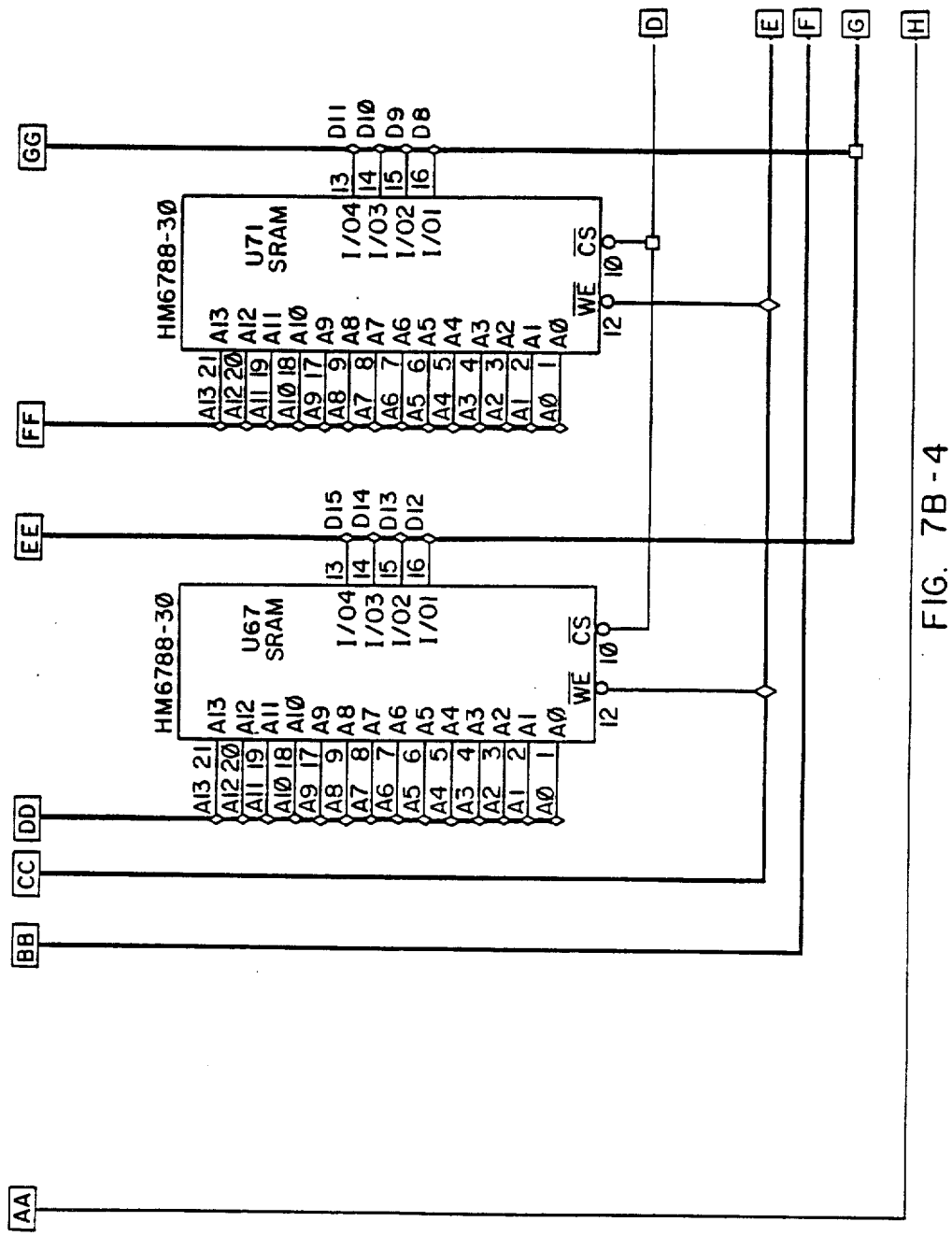

FIGS. 7A and 7B contain a detailed schematic drawing of the presently preferred circuit implementation of translation table A 136A and translation table B 136B represented in FIG. 2. The translation table circuits of FIGS. 7A and 7B are nearly identical to each other. The differences will be noted below.

Each translation table circuit of the presently preferred embodiment is provided with eight static random access memory (SRAM) devices commonly designated in the art as HM6788-30 and described as a fast access 16K×4 bit SRAM.

By providing eight of these SRAM devices, the total memory in each translation table is 524,288 bits (512K), allowing 16,384 32-bit entries to be stored in each translation table. It will be noted that each device reads or writes four bits of data at a time for a total of 32 bits for each read or write cycle.

The SRAM devices designated U42, U50, U54, U60, U66, U70, U76, and U78 shown in FIG. 7A comprise translation table A. SRAM devices designated U43, U51, U55, U61, U67, U71, U77, and U79 shown in FIG. 7B comprise translation table B.

Each translation table circuit has associated with it a PAL device. In FIG. 7A, the PAL device is designated U108 and in FIG. 7B the PAL device is designated U100. Both of these devices are of the type generally designated in the art as PAL16L8-10.

PAL Device U108 (TTACTRL) generates data enable signals and write enable signals for translation table A. These signals occur when table entries are being accessed by computer system managing software and do not occur when the memory management system is performing address translation for processes. PAL device U100 (TTBCTRL) likewise generates data enable signals and write enable signals for translation table B. These signals also occur when table entries are being accessed by system managing software.

The code used to program the PAL device designated U108 is provided below in Table V. The code used to program the PAL device designated U100 is provided below in Table VI.

TABLE V

/UUWE /UMWE /LMWE /LLWE /TRNSLD ADRS2 /WRITE NC NC GND
NC /EN3 /EN2 /EN1 /EN0 /WE3 /WE2 /WE1 /WE0 VCC
IF (VCC) WE0 = UUWE * /ADRS2 * TRANSLD
IF (VCC) WE1 = UMWE * /ADRS2 * TRANSLD
IF (VCC) WE2 = LMWE * /ADRS2 * TRANSLD
IF (VCC) WE3 = LLWE * /ADRS2 * TRANSLD
IF (VCC) EN0 = UUWE * /ADRS2 * TRANSLD + /WRITE * /ADRS2 * TRNSLD
IF (VCC) EN1 = UMWE * /ADRS2 * TRANSLD + /WRITE * /ADRS2 * TRNSLD
IF (VCC) EN2 = LMWE * /ADRS2 * TRANSLD + /WRITE * /ADRS2 * TRNSLD
IF (VCC) EN3 = LLWE * /ADRS2 * TRANSLD + /WRITE * /ADRS2 * TRNSLD

TABLE VI

/UUWE /UMWE /LMWE /LLWE /TRNSLD ADRS2 /WRITE NC NC GND
NC /EN3 /EN2 /EN1 /EN0 /WE3 /WE2 /WE1 /WE0 VCC
IF (VCC) WE0 = UUWE * ADRS2 * TRANSLD
IF (VCC) WE1 = UMWE * ADRS2 * TRANSLD
IF (VCC) WE2 = LMWE * ADRS2 * TRANSLD
IF (VCC) WE3 = LLWE * ADRS2 * TRANSLD
IF (VCC) EN0 = UUWE * ADRS2 * TRANSLD + /WRITE * ADRS2 * TRNSLD
IF (VCC) EN1 = UMWE * ADRS2 * TRANSLD + /WRITE * ADRS2 * TRNSLD
IF (VCC) EN2 = LMWE * ADRS2 * TRANSLD + /WRITE * ADRS2 * TRNSLD
IF (VCC) EN3 = LLWE * ADRS2 * TRANSLD + /WRITE * ADRS2 * TRNSLD

Each of the four inputs/outputs (I/O) (cumulatively designated as D0-D31) from the static random access memory devices are directly applied to translation table A data bus (TTADATABUS) or translation table B data bus (TTBDATABUS), whichever may be the case. The 32 bits represented by D0-D31 are also applied to four devices, each commonly designated in the art as F245 and described as 8-bit bidirectional drivers. The bidirectional drivers associated with translation table A are designated U90, U101, U109, and U120 in FIG. 7A and are connected to the data bus (DATABUS). The bidirectional drivers associated with translation table B are designated U91, U102, U110, and U121 in FIG. 7B and are similarly connected.

| GLOSSARY B (FIGS. 7A AND 7B) | |
|---|---|
| Signal/Bus | Function |
| TTADRSBUS | Translation Table Address Bus. Provides address information to the address Translation Memory. Size is 14 bits (labeled A0 through A13). |
| UUWE/ | Upper-Upper Write Enable signal (low asserted). Generated by decode circuitry when (not shown in FIGS. 7A and 7B) the CPU writes the most significant 8-bit byte of the Data Bus (D24 through D31). |
| UMWE/ | Upper-Middle Write Enable signal (low asserted). Generated by decode circuitry (not shown in FIGS. 7A and 7B) when the CPU writes the second most significant 8-bit byte of the Data Bus (D16 through D23). |
| LMWE/ | Lower-Middle Write Enable Signal (low asserted). Generated by decode circuitry (not shown in FIGS. 7A and 7B) when the CPU writes the third most significant 8-bit byte of the Data Bus (D8 through D15). |
| LLWE/ | Lower-Lower Write Enable Signal (low asserted). Generated by decode circuitry (not shown in FIGS. 7A and 7B when the CPU writes the least significant 8-bit byte of the Data Bus (D0 through D7). |
| TRNSLD/ | Translation Table Load Select Signal (low asserted). Generated by decode circuitry (not shown in FIGS. 7A and 7B) from a combination of address bits from the CPU. This signal asserts when the CPU reads or writes the translation tables for maintenance by system software. This signal does not occur when the memory management system is performing address translation for processes. |
| WRITE | Write Signal. Generated by the CPU when a write operation is performed. |
| ADRSBUS | Address Bus. Carries the same information as Unbuffered Address Bus (UBADRSBUS see FIG. 6). |
| DATABUS | Data Bus. Carries data to and from the CPU. Size is 32 bits (labeled D0 through |

-continued

GLOSSARY B (FIGS. 7A AND 7B)

| Signal/Bus | Function |
|---|---|
| | D31). |
| Bus appearing in FIG. 7A but not in FIG. 7B: | |
| TTADATABUS | Translation Table A Data Bus. Carries data from translation table A to the tag comparators and the frame pointer/offset field multiplexor. Size is 32 bits. |
| Bus appearing in FIG. 7B but not in FIG. 7A: | |
| TTBDATABUS | Translation Table B Data Bus. Carries data from translation table B to the tag comparators and the frame pointer/offset field multiplexor. Size is 32 bits. |

It should be appreciated that the presently preferred embodiment of the translation memory is just one possible arrangement which could be used to provide a translation memory for use with the present invention. Alternative embodiments for carrying out the translation memory portion of the present invention may also be devised.

5. Description of the Circuit Implementation of the Tag Comparators of the Presently Preferred Embodiment—FIG. 8.

Figures 1, 8:
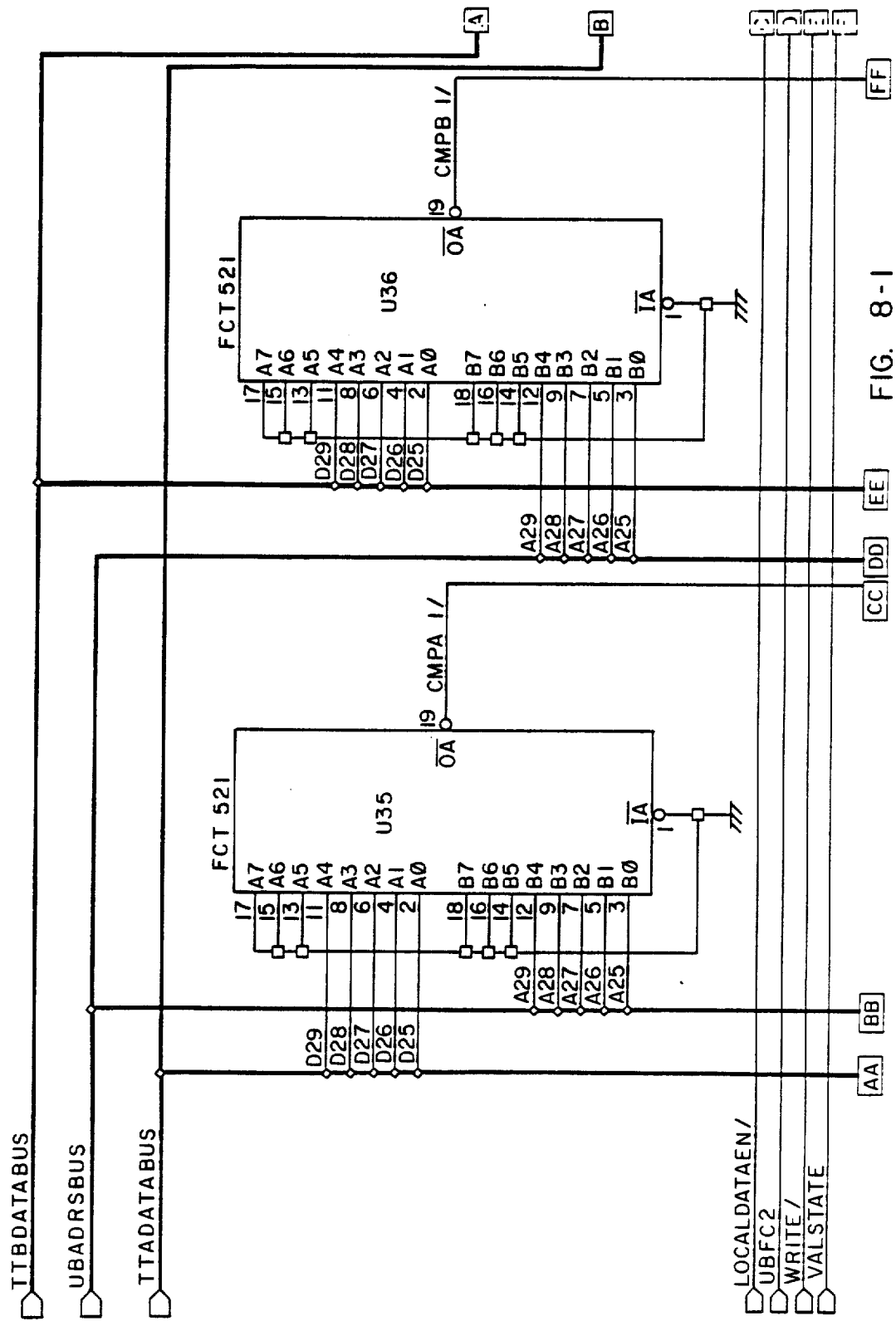
Figures 2, 8:
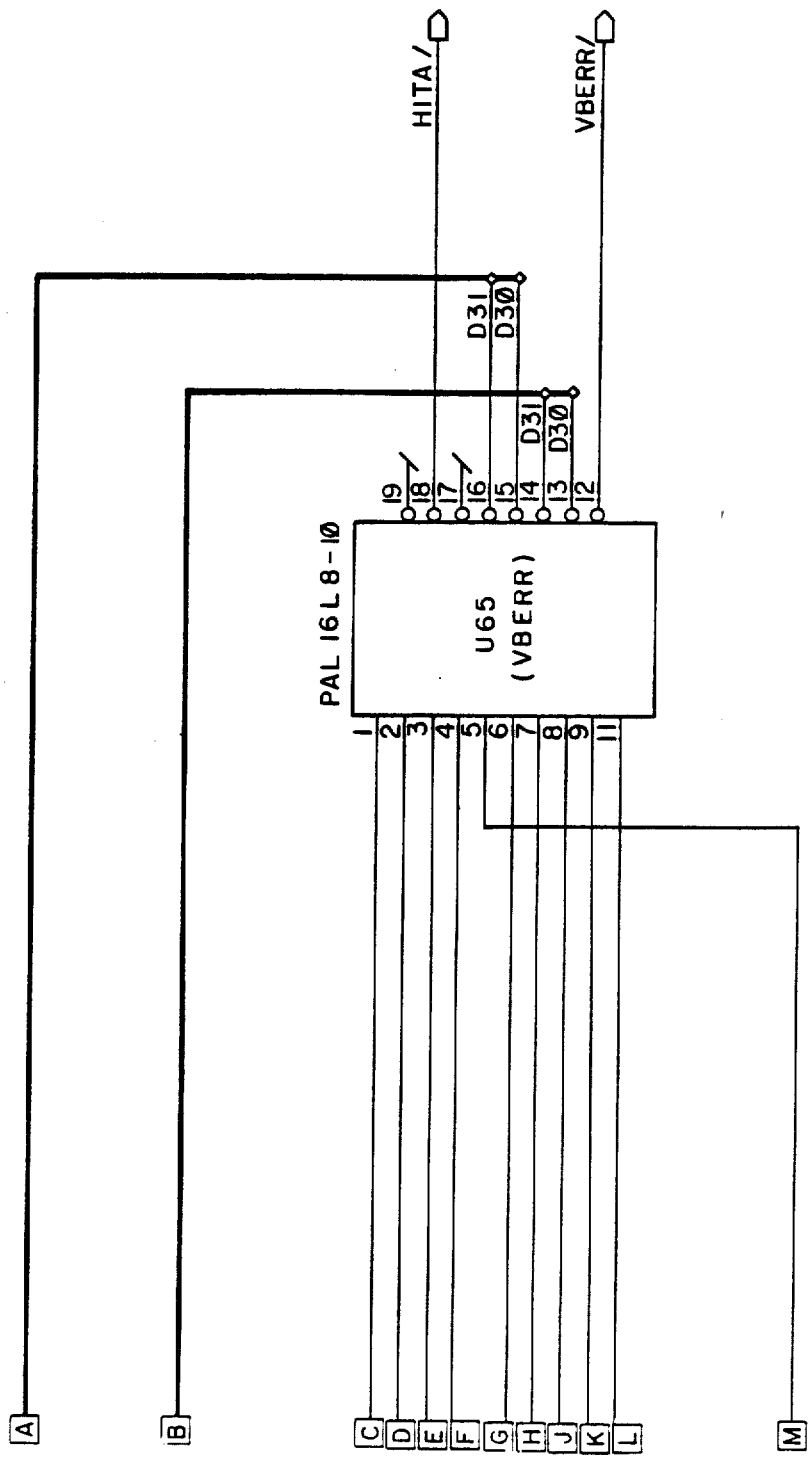
Figures 3, 8:
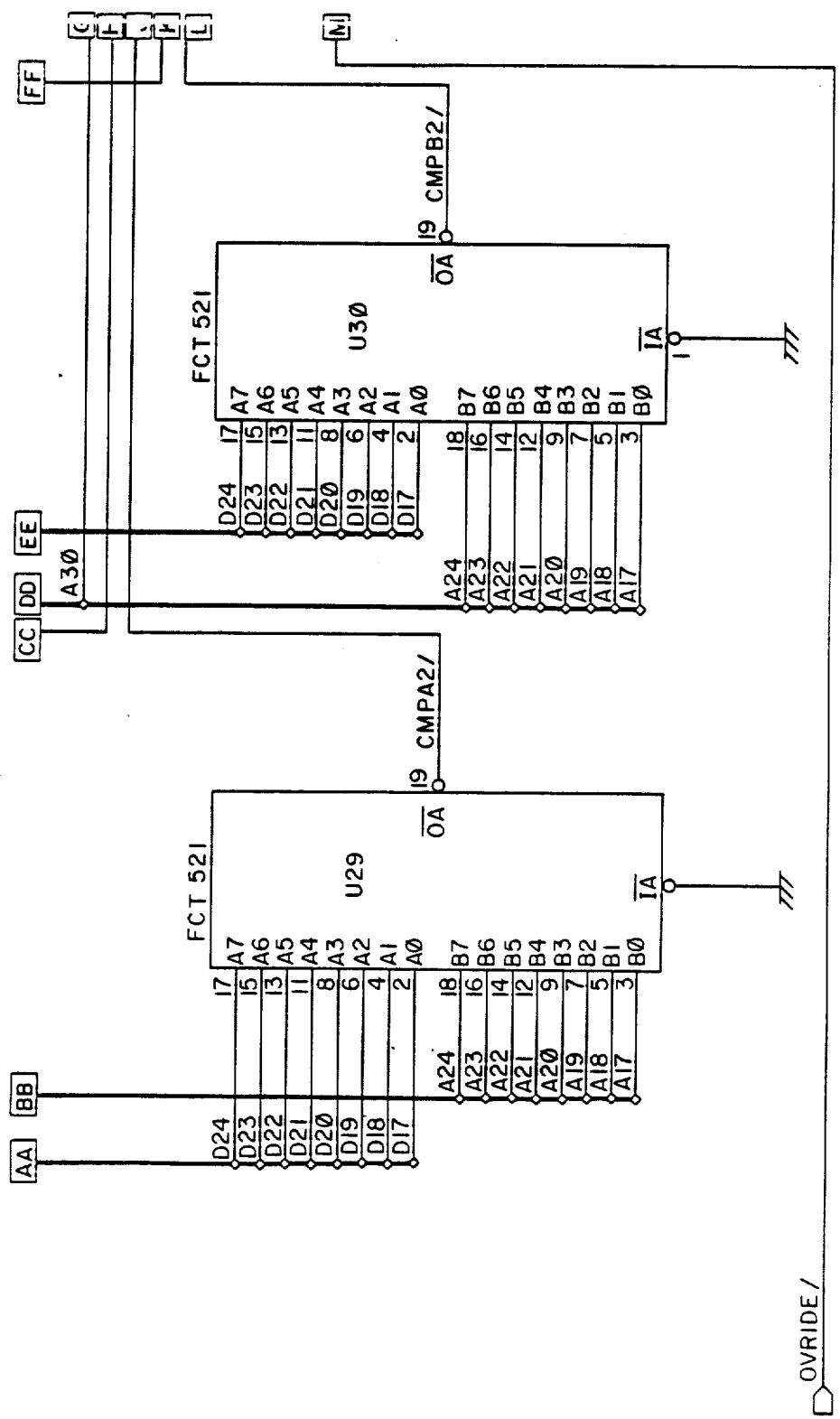

FIG. 8 contains a detailed schematic diagram of the presently preferred circuit implementation of the tag comparators represented by blocks 148A and 148B in FIG. 2. As illustrated in FIG. 8, each tag comparator comprises two devices generally designated in the art as FCT 521. The FCT 521 devices are generally described as 8-bit identity comparators. Devices U35 and U29 form the tag comparator associated with translation table A. Devices U36 and U30 form the tag comparator associated with translation table B.

As is indicated in FIG. 8, D17-D29 from translation table A databus (TTADATABUS) is applied to devices U35 and U29. Likewise, logical address bits A17-A29 are also presented to devices U35 and U29 from the unbuffered address bus (UBADRSBUS). It will be appreciated that this structure provides the means whereby tag bits T17-T29 (shown in FIG. 2 and which correspond to D17-D29 in FIG. 8) are compared to logical address bits A17-A29. It will be noted that three inputs of U35 are unused since only 13 bits are compared. An identical arrangement using U36 and U30 carries out the same function as previously described except using D17-D29 received from translation table B (TTBDATABUS).

Figures 1, 9:
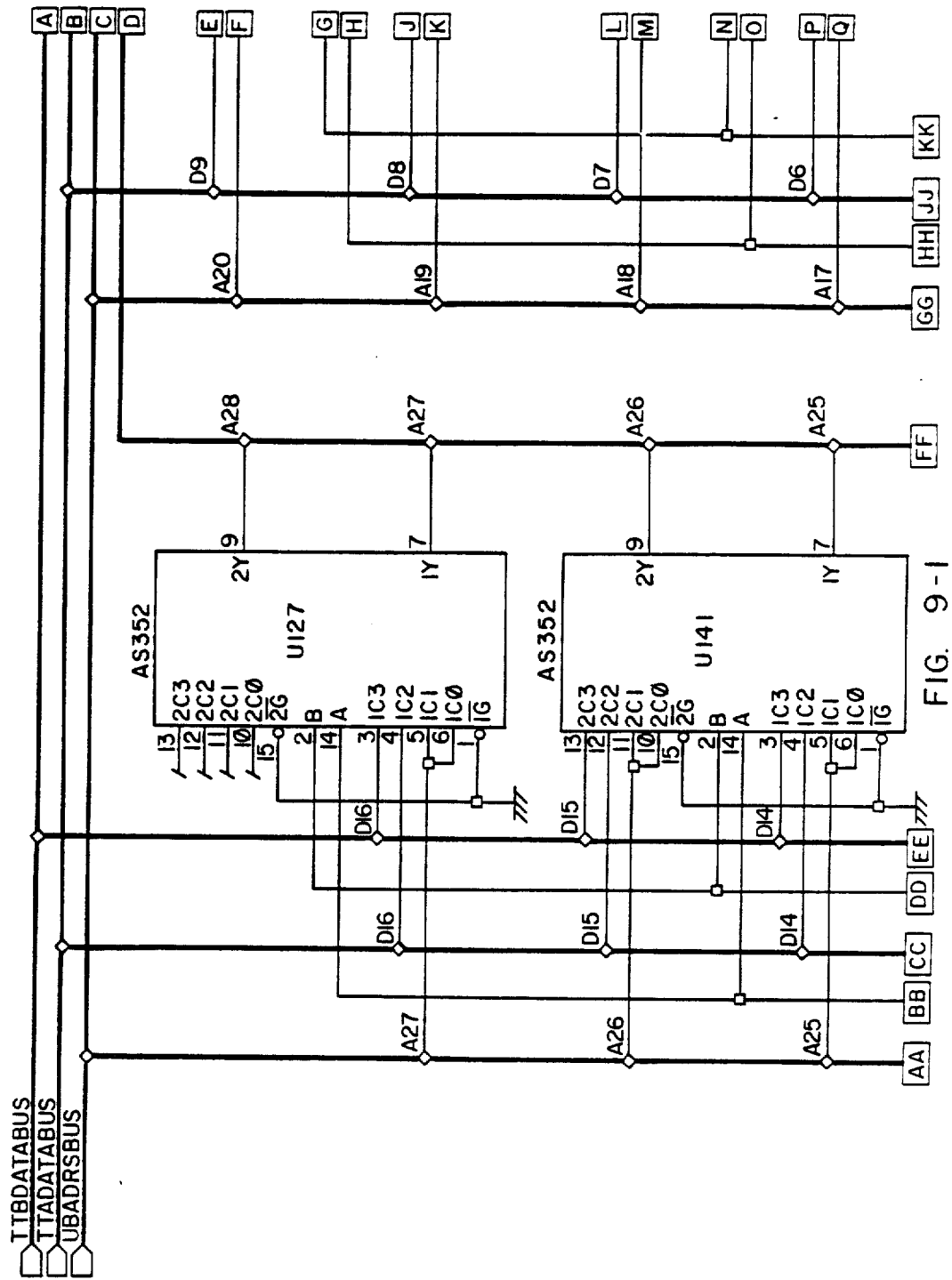
Figures 2, 9:
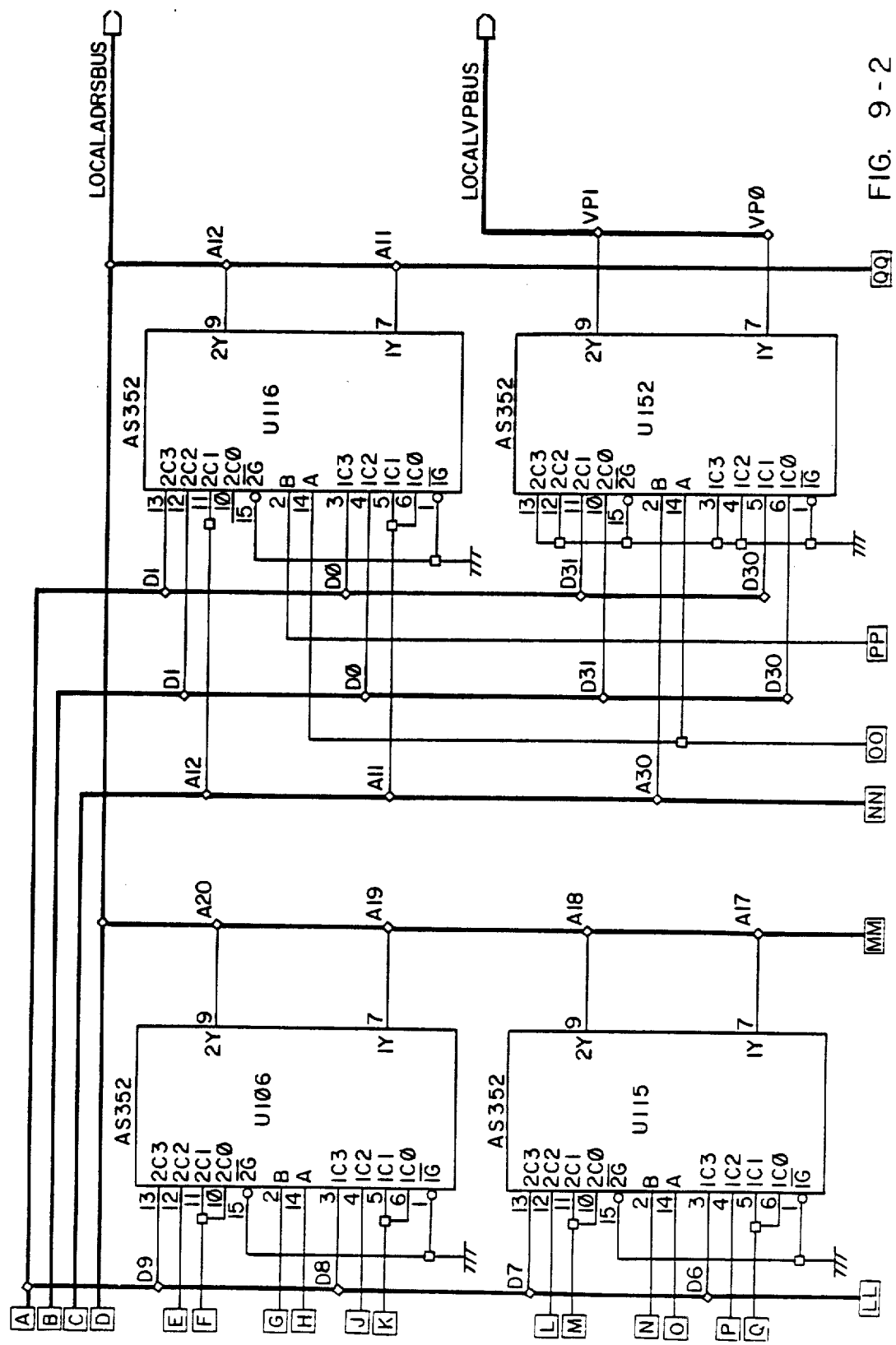
Figures 3, 9:
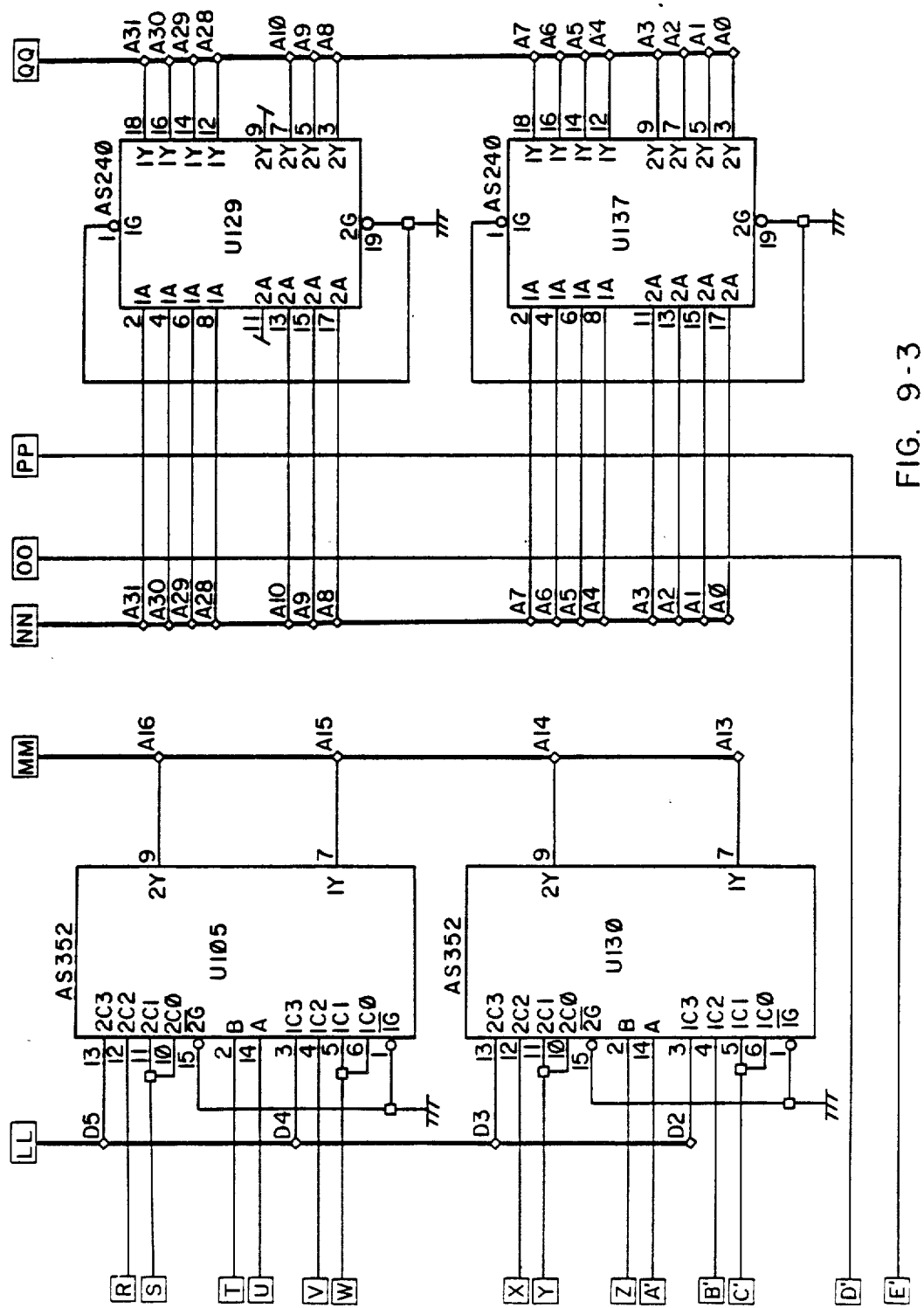
Figures 4, 9:
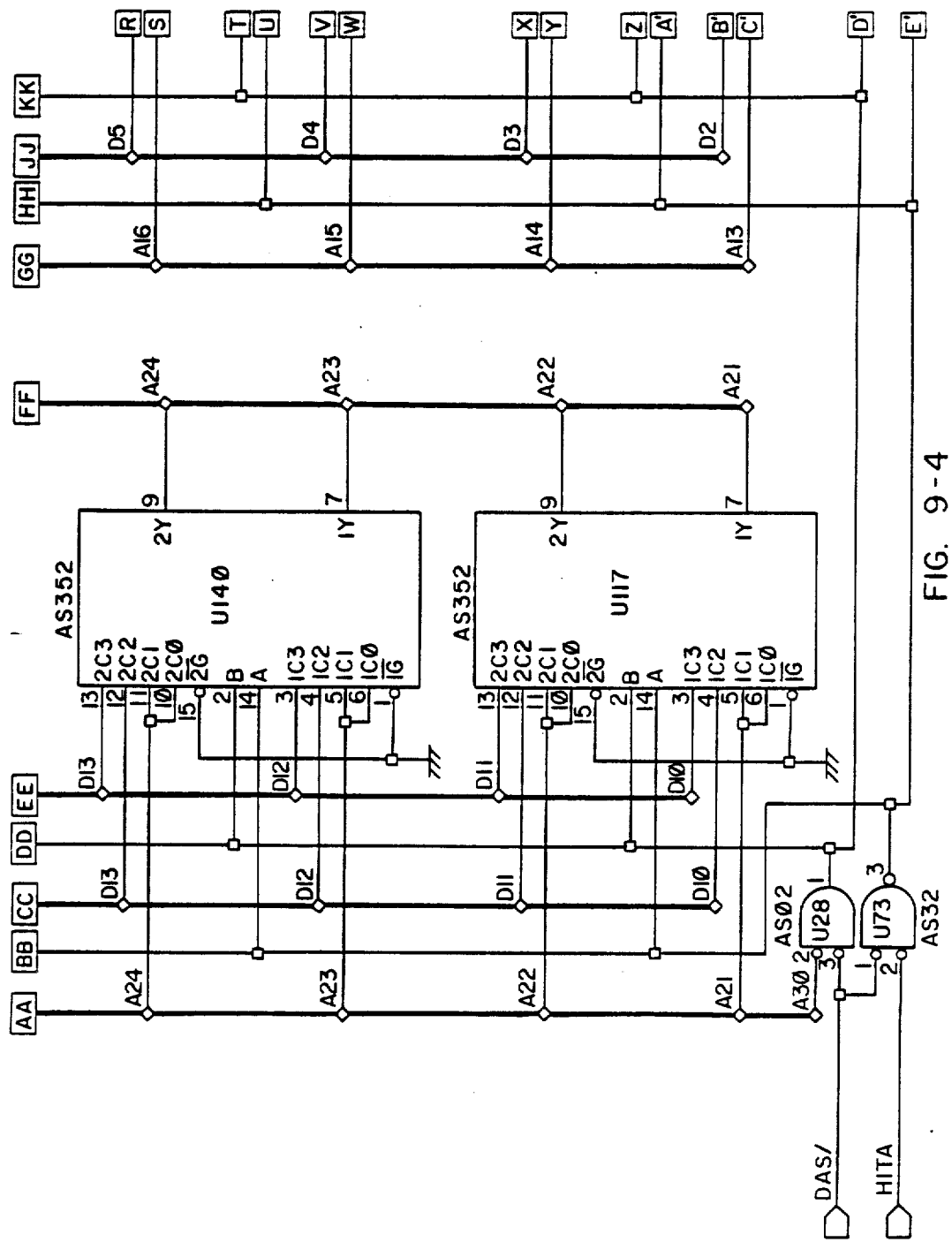

Each of the signals from the comparator devices (U35, U29, U36 and U30) are presented to a PAL device designated U65 in FIG. 9. The PAL device designated U65 is preferably of the type known in the art as PAL16L8-10.

Device U65 is referred to as the VBERR PAL in the presently preferred embodiment. PAL U65 generates two signals: Virtual Bus Error (VBERR) and Hit A (HITA). Each of these signals will be explained below.

If the outputs of both device U35 and device U29 are asserted, then it is known that a hit has occurred in translation table A. Similarly, if the outputs of U36 and U30 are both asserted, it is known that a hit has occurred in translation table B. If a hit does not occur, or if some other parameter is incorrect, such as when a protection violation has occurred, PAL U65 is programmed to generate a virtual bus error (VBERR) which is presented to the CPU indicating that a page fault has occurred. Only two signals are output from PAL U65, HITA or VBERR. If neither HITA nor VBERR are asserted, a hit must have occurred in translation table B.

Provided below in Table VII is the code which is used to program PAL U65 in the presently preferred embodiment in the same manner as explained earlier in connection with the other PAL devices.

TABLE VII

```
/LOCALDATAEN FC2 /WRITE VALSTATE /OVERIDE ADRS30 /CMPA1 /CMPA2 /CMPBIGND /CMPB2
/VBERR VPA0 VPA1 VPB1 /HITB nc VCC
IF (VCC) HITA = CMPA1 * CMPA2 * VPA1 + CMPA1 * CMPA2 * VPA0
IF (VCC) HITB = CMPB1 * CMPB2 * VPB1 + CMPB1 * CMPB2 * VPB0
IF (VCC) VBERR = ADRS30 * /HITA * /H1IB * LOCALDATAEN * VALSTATE
       + /ADRS30 * HITA * WRITE * VPA1 * /VPA0 * LOCALDATAEN * VALSTATE
       + /ADRS30 * HITB * WRITE * VPB1 * VPB0 * LOCALDATAEN * VALSTATE
       + /ADRS30 * HITA * WRITE * /FC2 * /VPA1 * VPA0 * LOCALDATAEN * VALSTATE
       + /ADRS30 * HITB * WRITE * /FC2 * /VPB1 * VPB0 * LOCALDATAEN * VALSTATE
       + /LOCALDATAEN * /FC2 * /OVERIDE + ADRS30 * /FC2 * /OVERIDE
```

It will be noted that the validate and protect (VP) bits (D30-D31) are presented directly to PAL U65. Thus, U65 is programmed to produce a virtual bus error (VBERR) signal to the CPU if the selected translation table entry is invalid or if it is protected. The signals and/or buses which are represented in FIG. 8 are listed below in Glossary C.

GLOSSARY C (FIG. 8)

| Signal/Bus | Function |
|---|---|
| TTBDATABUS | Translation Table B Data Bus. Carries data from Translation Table B to the tag comparators and the frame pointer/offset field multiplexor. Size is 32 bits. |
| UBADRSBUS | Unbuffered Address Bus. Carries logical addresses from the CPU to the memory management system. Size is 32 bits (labeled A0 through A31). |
| TTADATABUS | Translation Table A Data Bus. Carries data from translation table A to the tag comparators and the frame pointer/offset field multiplexor. Size is 32 bits. |
| LOCALDATAEN/ | Local Data Enable Signal (low asserted). Indicates that the memory management system is enabled and an access is being made which requires address translation by the memory management system. |
| UBFC2 | Unbuffered Function Code 2 Signal. Generated by the CPU during accesses made in supervisor mode. This mode is reserved for use by computer system managing software. |
| WRITE/ | Write Signal (low asserted). Generated by the CPU when a write operation is performed. |
| VALSTATE | Valid State Signal. Generated by timing circuitry (not |

GLOSSARY C (FIG. 8) -continued

| Signal/Bus | Function |
|---|---|
|  | shown in FIG. 8) to enable the VBERR signal to indicate error conditions to the CPU only when it is valid. |
| OVRIDE/ | Override Signal (low asserted). This signal is under the control of computer system managing software and prevents the VBERR signal from being issued when protection violations occur. Can be used to give processes the same privileges as system managing software functions. |
| CMPA1/ | Compare Table A1 Signal (low asserted). Asserts when most significant 5 bits of the tag in translation table A are equal to their corresponding bits in the logical address. |
| CMPA2/ | Compare Table A2 Signal (low asserted). Assets when least significant 8 bits of the tag in translation table A are equal to their corresponding bits in the logical address. |
| CMPB1/ | Compare Table B1 Signal (low asserted). Asserts when most significant 5 bits of the tag in translation table B are equal to their corresponding bits in the logical address. |
| CMPB2/ | Compare Table B2 Signal (low asserted). Asserts when least significant 8 bits of the tag in translation table B are equal to their corresponding bits in the logical address. |
| HITA/ | Hit table A Signal (low asserted). Asserts when a match has been detected between the tag in translation Table A and the corresponding bits in the logical address. |
| VBERR/ | Virtual Bus Error Signal (low asserted). Asserts when no match is found in the translation table tags or When a protection violation occurs. |

It should be appreciated that the presently preferred embodiment is just one possible arrangement for implementation of the comparators of the present invention. It is expected that many different devices presently available, and which may become available in the future, can be used to carry out the functions of these portions of the presently preferred embodiment.

6. Description of the Circuit Implementation of the Frame Pointer/Offset Field Multiplexor Circuit of the Presently Preferred Embodiment—FIG. 9.

FIG. 9 contains a detailed schematic drawing of the presently preferred circuit implementation of the frame pointer/offset field multiplexor, represented by block 150 in FIG. 2, of the presently preferred embodiment of the present invention.

As will be appreciated from the previous discussion, the function of the frame multiplexor is to provide a physical (translated) address which is derived from the logical address and the frame pointer of the selected translation table entry if a hit has occurred. In FIG. 9 it can be seen that ten devices commonly designated in the art as AS352 and described as dual 4-line to 1-line data selectors/multiplexors are provided.

Each of these devices, designated in FIG. 9 as U127, U141, U140, U117, U106, U115, U105, U130, U116, and U152, is presented with one bit of logical address (provided by UBADRSBUS A11-A27) and one bit from the selected entry in translation table A or the selected entry in translation table B. The bits from the selected translation table are presented to the AS352 devices by translation table A (TTADATABUS) or translation table B databus (TTBDATABUS).

Each AS352 device is operated in accordance with the state of the HITA, DAS/, and A30 (also referred to as VP0) signals so that the appropriate bits from either the logical address, the translation table A entry, or translation table B entry may be placed on the local address bus (LOCALADRSBUS) which presents the address to the main memory.

Table VIII provides a summary of the effect of the A30 (VP0), HITA, and DAS/ signals on what information is placed on the LOCALADRSBUS and LOCALVPBUS busses.

TABLE VIII

| A30 | HITA | DAS/ | Bits Placed on LOCALADRSBUS | Bits Placed on LOCALVPBUS |
|---|---|---|---|---|
| 0 | 0 | 0 | Logical Address | TABLE B VP Bits |
| 0 | 0 | 1 | Translation Table B Frame Pointer | Table B VP Bits |
| 0 | 1 | 0 | Logical Address | Table A VP Bits |
| 0 | 1 | 1 | Translation Table A Frame Pointer | Table A VP Bits |
| 1 | 0 | 0 | Logical Address | 0, 0 |
| 1 | 0 | 1 | Logical Address | 0, 0 |
| 1 | 1 | 0 | Logical Address | 0, 0 |
| 1 | 1 | 1 | Logical Address | 0, 0 |

As explained previously, it is the offset field of the logical address A0–A10 which specifies a location within a 2KByte page in main memory. Thus, there is no need to translate bits A0–A10 of the logical address to a physical address. Because there is no need to translate these bits, the logical address bits A0–A10 are directly presented to devices U129 and U137 which are designated in the art as AS240 and described as octal buffers/line drivers with inverting 3-state outputs. In this fashion, the bits corresponding to the offset field bits of the logical address are placed directly on the local address bus (LOCALADRSBUS).

It should also be noted that a local validate and protect bus (LOCALVPBUS) is also provided. Device U152 (also an AS352 device) functions to place the proper bits on the local validate and protect bus. The local validate and protect bus provides a readily available signal to other portions of the computer system which need to rapidly determine whether the selected translation table entry is valid and/or protected. Table VIII provided above shows the functional operation of device U152.

Provided below in Glossary D is a list of the signals and/or buses appearing in FIG. 9.

GLOSSARY D (FIG. 9)

| Signal/Bus | Function |
|---|---|
| TTBDATABUS | Translation Table B Data Bus. Carries data from translation table B to the tag comparators and the frame pointer/offset field multiplexor. Size is 32 bits. |
| TTADATABUS | Translation Table A Data Bus. Carries data from translation table A to the tag comparators and the frame pointer/offset field multiplexor. Size is 32 bits. |

-continued

| GLOSSARY D (FIG. 9) | |
|---|---|
| Signal/Bus | Function |
| UBADRSBUS | Unbuffered Address Bus. Carries logical addresses from the CPU to the memory management system. Size is 32 bits, labeled A0 through A31. |
| DAS/ | Delayed Address Strobe Signal (low asserted). Generated by the CPU to indicate that a memory access has begun and that the address bus is valid. |
| HITA/ | Hit Table A Signal (low asserted). Asserts when a match has been detected between the tag in translation table A and the corresponding bits in the logical address. |
| LOCALADRSBUS | Local Address Bus. Carries address information to the main memory. Size is 32 bits. |
| LOCALVPBUS | Local Valid Protect Bus. Carries valid and protect information to the main memory. Size is 2 bits. |

As with the other specific circuit implementations described, the foregoing represents one possible arrangement for implementation of the frame pointer/offset field multiplexor. Other architectures, whether using the same or different devices, could be designed to perform the functions required of the frame pointer/offset field multiplexor.

SUMMARY

The present invention comprises a significant advance in the art of memory management systems for digital computers. While it is desirable to provide a memory management system in a computer system, either to more efficiently use physical memory or to implement a virtual memory scheme, it is essential that the memory management system be able to carry out its functions rapidly and efficiently.

The present invention provides a memory management system which is more efficient in several respects than those systems previously available. The present invention provides a memory management system which is configurable into groups, each group including a varying number of entries according to the particular needs of the processes which are residing in the computer system. Thus, the present invention has particular application for use in computer systems involved in multiprocessing.

Another advance provided by the present invention is that the configuring, or partitioning, of the memory management system may be accomplished dynamically. That is, as processes become active, and as pages are moved into and out of main memory, the partitioning of the translation memory may be altered in order to most efficiently use the translation memory and main memory.

Importantly, the present invention allows the computer system managing software, e.g., the operating system, to readily reconfigure the partitioning of the translation memory in the course of carrying on normal operation. Thus, the present invention is extremely flexible since the reconfiguration of the translation memory is under software control and does not require any alteration of computer system hardware or cause any computer system "down time."

Still further, the present invention allows a memory management system, and its accompanying main memory, to handle an increased number of processes without requiring increased translation memory space. Even further, the present invention allows the amount of translation memory devoted to each process to be optimized. Another advantage which accrues by use of the present invention is that the context switching time in a computer system is reduced to a minimum and the number of page faults which occur are also reduced. These and many others advantages will be appreciated by those who are skilled in the art.

The present invention may be embodied in specific forms other than the herein described preferred embodiment without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a digital computing system for simultaneously processing a plurality of processes, which processes are of various sizes which require differing amounts of utilization of main memory within said digital computing system, and wherein said digital computing system comprises a logical address generating device and a system managing software program for controlling overall system operation, an improved memory management system comprising:

a translation memory means for storing a plurality of addressable entries each containing address information used in mapping logical addresses input from said logical address generating device into corresponding physical addresses which identifiy portions of said main memory, said translation memory means operating under control of said system managing software program so as to periodically group said entries into groups corresponding in size to the memory requirements of each said process that is actively being processed by said digital computing system each time a new process begins to be actively processed;

first register means, operating under control of said system managing software program, for temporarily storing and outputting the number of entries grouped for each said process;

second register means, operating under control of said system managing software program, for temporarily storing and outputting an entry address for each said process which identifies the location within said translation memory means at which a corresponding group of entries allocated to said process is to be found;

translation memory address means for selecting an address of a specific entry stored within said translation memory means in response to a first portion of said logical address input from said logical address generating device, and in response to the outputs from said first and second register means, said address of said specific entry being output from said translation memory address means to said translation memory means; and means for receiving from said translation memory means the address information used in mapping logical addresses into corresponding physical addresses for said specific entry, and for receiving a second portion of said logical address and deriving from said second portion and said address information output from said translation memory means a corresponding physical address of said main memory.

2. A memory management system as defined in claim 1 wherein the first register means comprises a mask register and the second register means comprises a base register.

3. A memory management system as defined in claim 2 wherein said logical address generating device uses a number of bits to define a page field and a volume field in said logical address, the number of bits defining the page field and the volume field being variable.

4. A memory management system as defined in claim 3 wherein said portion of said logical address input to said translation memory address means comprises the number of bits in the logical address which are defined as the page field.

5. A memory management system as defined in claim 4 wherein said logical address generating device uses a number of bits to define an offset field in said logical address.

6. A memory management system as defined in claim 5 wherein the offset field of the logical address specifies a single location in a page of said main memory.

7. A memory management system as defined in claim 2 wherein a value stored in the base register specifies a beginning entry for the group of entries partitioned for a currently active process.

8. A memory management system as defined in claim 3 wherein said translation memory address means comprises a multiplexing means for selecting the address of said specific entry stored in the translation table means in response to the bit patterns from the page field, and in response to inputs from the mask register and the base register.

9. A memory management system as defined in claim 3 wherein the mask register and the base register each comprise eight bit registers and wherein the page field may comprise from six bits to fourteen bits, the number of bits in the logical address defined as the page field increasing by one bit as each bit in the mask register is asserted.

10. A memory management system as defined in claim 3 wherein the smallest group of translation memory entries which may be partitioned is sixty-four entries, which occurs when the page field is defined as six bits, and the largest group of translation memory entries which may be partitioned is 16,384 entries, which occurs when the page field is defined as fourteen bits.

11. A memory management system as defined in claim 1 wherein each entry comprises:
a frame pointer; and
a tag.

12. A memory management system as defined in claim 11 wherein the frame pointer specifies a discrete portion of the main memory.

13. A memory management system as defined in claim 11 wherein the frame pointer specifies a page in the main memory.

14. A memory management system as defined in claim 11 wherein the tag is equivalent to a specific bit pattern in the logical address which is mapped to a page in the main memory specified by the frame pointer contained in the same entry as the tag.

15. A memory management system as defined in claim wherein said meas for receiving comprises means for comparing the tag to said portion of the logical address and for determining the equivalency of the tag to said portion of the logical address.

16. A memory management system as defined in claim 15 wherein the means for comparing the tag comprises a tag comparator.

17. A memory managment system as defined in claim 15 wherein said means for receiving comprises a concatenation means for concatenating a frame pointer and a field in the logical address to form a translated physical address.

18. A memory management system as defined in claim 17 wherein the concatenation means comprises a frame pointer/offset field multiplexor.

19. A memory management system as defined in claim 1 wherein the translation memory comprises an N-way set associative translation memory means.

20. A memory management system as defined in claim 1 wherein the translation memory means comprises a 2-way set associative translation memory.

21. A memory management system as defined in claim 1 wherein the translation memory means comprises two corresponding translation tables stored therein, a plurality of entries in each translation table being simultaneously accessed by said address of said specific entry.

22. A memory managment system for use in a digital computer system hosting a plurality of processes, the digital computer system including a CPU which places logical addresses on a logical address bus and an addressable main memory, the memory management system comprising:
an associative translating memory in which a plurality of entries are stored, each entry comprising a tag portion and a frame pointer;
a mask register for storing and outputting a bit pattern specifying a number of bits defined as a page field in one of said logical addresses, the page field corresponding to a number of translation memory entries allocated as a group and assigned to a particular one of said plurality of processes, one such group being assigned to each such process;
a base register for storing and outputting a bit pattern specifying a beginning location within the translation memory of one of the groups of said entries;
a translation memory address multiplexor connected at an input side thereof to the logical address bus, the mask register, and to the base reigster, the translation memory address multiplexor comprising means for selecting a translation memory entry in response to the bit patterns input to said multiplexor from said mask register, said base register, and in response to a first portion of said logical address input to said multiplexor from said CPU, said selected translation memory entry being output to said associative translation memory;
means for comparing the tag portion of said selected translation memory entry to said first portion of said logical address and for indicating when the tag and the first portion of the logical address are equivalent; and
means for concatenating a second portion of the logical address with the frame pointer in the selected translation memory entry to derive therefrom a translated physical address.

23. In a digital computing system for simultaneously processing a plurality of processes, which processes are of various sizes which require differing amounts of utilization of main memory within said digital computing system for efficient operation, and wherein said digital computing system comprises a logical address generating device and a system managing software program for controlling overall system operation, an improved memory management method comprising the steps of:
- storing in a translation memory means a plurality of addressable entries each containing address information used in mapping logical addresses output by said logical address generating device into corresponding physical addresses which identify portions of said main memory;
- operating said translation memory means under control of said program so as to periodically group said entries into groups corresponding in size to the amount of main memory required by each said process that is actively being processed by said digital computing system each time a new process begins to be actively processed;
- operating a first register means under control of said program so as to temporarily store and output a number corresponding to the number of entries grouped for each said process;
- operating a second register means under control of said program so as to temporarily store and output an entry address for each said process which identifies the location within said translation memory means at which a corresponding group of entries allocated to said process is found;
- inputting to a translation memory address means a first and a second portion of said logical address and the outputs from said first and second register means, said translation memory address means thereafter selecting and outputting to said translation memory means an address of a specific entry stored in one of said groups;
- outputting from said translation memory means the address information corresponding to said specific entry;
- inputting to a comparison means a first portion of the address information output from said translation memory means and comparing said first portion of said output address information to said second and to a third portion of said logical address also input to said comparison means, and enabling concatenation of a second portion of the address information corresponding to said selected entry if said first portion of the address information matches said second and third logical address portions; and
- concatenating the second portion of the address information corresponding to said selected entry with a fourth portion of said logical address so as to thereby form and output a physical address of said main memory corresponding to said selected entry.

24. A method as defined in claim 23 wherein the step of operating said first register means comprises the step of receiving a bit pattern loaded into a mask register.

25. A method as defined in claim 23 wherein the step of operating said second register means comprises the step of loading a base index position bit pattern into a base register.

26. A method as defined in claim 23 wherein said first through said fourth portions of said logical address are defined by a plurality of bits which define a page field, a volume/page field, a volume field and an offset field, respectively.

27. A method as defined in claim 26 wherein the address information of each said entry is defined by a plurality of bits which define a tag and a frame pointer.

28. A method as defined in claim 27 wherein said step of inputting to said comparison means and comparing said first portion of the output address information comprises the step of comparing the tag of said specific entry to the volume field and volume/page field input to said translation memory address means.

29. A method as defined in claim 28 wherein said step of enabling concatenation of said second portion of the address information comprises the step of outputting the frame pointer of said selected entry.

30. A method as defined in claim 29 wherein said concatenating step comprises the step of concatenating the frame pointer of said selected entry with the offset field of the corresponding logical address from which said volume/page and page fields are input to said comparison means.

31. A method as defined in claim 30 wherein said step of storing said addressable entries comprises the step of arranging said entries into two tables stored in said translation memory means, and wherein said method further comprises the step of identifying an entry in each said table in response to said address information output from said translation memory address means.

32. A method as defined in claim 31 wherein said comparing step comprises the step of comparing the tag from each table with the volume field and volume/page field input to said translation memory address means.

33. A method as defined in claim 32 wherein said step of outputting said second portion of the address information comprises the step of outputting the frame pointer of the entry identified in each said table.

34. In a digital computer system adapted for simultaneously handling multiple processes and having at least one logical address generating device, an addressable memory, a memory managment system including a translation memory having a plurality of entries, each entry containing information necessary to map a logical address generated by said logical address generating device to a physical address in the addressable memory, a method of operating the memory management system comprising the steps of:
- periodically partitioning the translation memory entries into groups, each group selectively containing a number of entries and each group being assigned to a specific process residing in the computer system such that the number of translation table entries allocated to each process may be varied so that an optimum number of translation memory entries can be allocated to each process, said partitioning step comprising:
- receiving a base entry value indicating the position of the group of entries allocated to a currently active process; and
- receiving a mask value which determines the number of bits in the logical address which are defined as a page field and thereby determines the number of entries in a group allocated to a process, the base entry value and the mask value both being under the control of computer system managing software and both being input to the translation memory addressing means;

receiving a logical address presented to the memory management system;

selecting a translation memory entry corresponding to the logical address;

determining if the selected entry contains the information required to translate the logical address to a corresponding physical address; and deriving a physical address from a bit pattern contained within a selected entry and corresponding logical address.

35. A method as defined in claim 34 wherein the step of receiving a logical address comprises the step of receiving a logical address in virtual memory space and wherein the step of deriving a physical address comprises the step of deriving a physical address in the addressable memory.

36. A method as defined in claim 34 wherein the translation memory comprises two translation tables and the step of selecting a translation memory entry comprises the step of simultaneously selecting the corresponding entries of both translation tables.

37. A method as defined in claim 34 wherein each translation memory entry comprises a frame pointer containing information comprising a most significant portion of a physical address and a tag containing a bit pattern equivalent to a portion of a logical address which corresponds to the frame pointer located in the same entry as the tag and wherein the step of determining if the selected entry contains the correct information comprises the step of comparing the tag with a portion of the logical address.

38. A method as defined in claim 37 wherein the step of comparing the tag comprises the step of determining if the tag of the selected entry is equivalent to a portion of the logical address.

39. A method as defined in claim 34 wherein the translation memory comprises a plurality of translation tables and the system comprises a comparator for each translation table and the step of determining if the selected entry contains the information comprises the step of simultaneously comparing the tags of each entry to a portion of a logical address.

40. A method as defined in claim 34 wherein the step of deriving a physical address comprises concatenating a frame pointer in the selected entry with a portion of the logical address to derive a translated physical address.

41. A method as defined in claim 40 wherein the step of concatenating a frame pointer comprises the step of concatenating a frame pointer with a portion of the logical address which is defined as an offset field.

42. A method as defined in claim 34 wherein the step of selecting a translation memory entry comprises the step of selecting a translation memory entry according to the bit pattern of a page field defined in a logical address.

43. A method as defined in claim 42 wherein the step of selecting a translation memory entry comprises the steps of receiving the mask value and the base value selecting an entry according to the bit pattern of the logical address and the bit pattern of the mask value and the base value.

* * * * *

UNITED STATES PATENT AND TRADEMARK OFFICE
CERTIFICATE OF CORRECTION

PATENT NO. : 4,914,577                      Page 1 of 2

DATED : April 3, 1990

INVENTOR(S) : DARRYL J. STEWART et al.

It is certified that error appears in the above-identified patent and that said Letters Patent is hereby corrected as shown below:

```
    Column 1, line 8, "compputer" should be --computer--
    Column 1, line 20, "further" should be --future--
    Column 2, line 27, "partcular" should be --particular--
    Column 3, line 7, "contiquous" should be --contiguous--
    Column 6, line 3, "translation" should be --translate--
    Column 6, line 4, "CUP" should be --CPU--
    Column 6, lines 16-17, "patitioning" should be --partitioning--
    Column 6, line 20, "change" should be --change.--
    Column 6, line 24, "implememented" should be --implemented--
    Column 6, line 34, "objcet" should be --object--
    Column 26, line 43, delete "by"
    Column 7, line 24, "management" should be --managing--
    Column 7, line 25, "allocasted" should be --allocated--
    Column 8, line 3, "equvalent" should be --equivalent--
    Column 8, lines 21-22, sentence should be continued on same line
    Column 9, line 28, "architercture" should be --architecture--
    Column 9, line 60, "form" should be --from--
    Column 10, line 56, "thought" should be --though--
    Column 11, line 6, "amount" should be --amounts--
    Column 11, line 7, "provieded" should be --provided--
    Column 11, line 8, "memeory" should be --memory--
    Column 11, line 21, "(0-383)" should be --(0 - 16,383)--
    Column 12, line 55, "obove-mentioned" should be --above-
mentioned--
    Column 12, line 65, "sapace" should be --space--
```

UNITED STATES PATENT AND TRADEMARK OFFICE
CERTIFICATE OF CORRECTION

PATENT NO. : 4,914,577            Page 2 of 2

DATED : April 3, 1990

INVENTOR(S) : DARRYL J. STEWART et al.

It is certified that error appears in the above-identified patent and that said Letters Patent is hereby corrected as shown below:

```
Column 14, line 25, "alogrithms" should be --algorithms--
Column 35, line 27, "Assets" should be --Asserts--
Column 36, line 18, "busses" should be --buses--
Column 40, line 4, "claim" should be --claim 11--
Column 40, line 20, after "memory" insert --means--
Column 40, line 21, delete "means"
Column 40, line 37, "translating" should be --translation--
Column 40, line 53, "reigster" should be --register--
Column 44, line 11, "comprises" should be --comprising--
```

Signed and Sealed this

Tenth Day of November, 1992

Attest:

DOUGLAS B. COMER

Attesting Officer        Acting Commissioner of Patents and Trademarks